US012184631B2

(12) United States Patent
Gandhi et al.

(10) Patent No.: US 12,184,631 B2
(45) Date of Patent: Dec. 31, 2024

(54) MULTI-FACTOR AUTHENTICATION USING GESTURES

(71) Applicant: Cisco Technology, Inc., San Jose, CA (US)

(72) Inventors: Indermeet Gandhi, San Jose, CA (US); Srinath Gundavelli, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 170 days.

(21) Appl. No.: 17/875,105

(22) Filed: Jul. 27, 2022

(65) Prior Publication Data
US 2024/0039903 A1 Feb. 1, 2024

(51) Int. Cl.
*H04L 45/30* (2022.01)
*G06F 3/01* (2006.01)
(Continued)

(52) U.S. Cl.
CPC .............. *H04L 63/08* (2013.01); *G06F 3/017* (2013.01); *H04L 25/0222* (2013.01); *H04W 4/023* (2013.01); *H04L 2463/082* (2013.01)

(58) Field of Classification Search
CPC ... H04L 63/08; H04L 2463/082; G06F 3/017; H04W 4/023
See application file for complete search history.

(56) References Cited

U.S. PATENT DOCUMENTS 11,510,028 B1 * 11/2022 Gao .................... G01S 13/003
11,610,204 B1 * 3/2023 Osterkamp ............. G07C 9/37
(Continued)

FOREIGN PATENT DOCUMENTS

WO  WO2021019285 A1  2/2021
WO  WO2021234727 A2  5/2021
WO  WO2022087510 A1  4/2022

OTHER PUBLICATIONS

Liu, Hongbo, et al. "Practical user authentication leveraging channel state information (CSI)." Proceedings of the 9th ACM symposium on Information, computer and communications security. 2014.*

(Continued)

*Primary Examiner* — Jimmy H Tran
(74) *Attorney, Agent, or Firm* — Lee & Hayes, P.C.

(57) ABSTRACT

This disclosure describes techniques for performing multi-factor authentication (MFA) by utilizing user generated authenticating gestures. The techniques may include establishing and monitoring peer-to-peer communication links between user devices. The techniques may include monitoring channel properties for fluctuations in the channel properties associated with the user generated authenticating gesture passing through signals of the communication links. The techniques may further include comparing a gesture performed by a user to a predefined authenticating gesture. The techniques may include determining a pattern of fluctuations in the channel properties associated with the predefined authenticating gesture. The techniques may include determining a confidence score associated with comparing the gesture performed and the predefined authenticating gesture. The techniques may further include determining a proximity of the user and/or the gesture to the user device. The techniques may further include granting or denying the user based at least in part on the proximity and/or the comparison.

20 Claims, 10 Drawing Sheets

(51) Int. Cl.
  *H04L 9/40* (2022.01)
  *H04L 25/02* (2006.01)
  *H04W 4/02* (2018.01)

(56) References Cited

U.S. PATENT DOCUMENTS

| | | | |
|---|---|---|---|
| 2016/0048322 A1* | 2/2016 | Raffa | G06V 40/20 715/733 |
| 2017/0083694 A1* | 3/2017 | Mardikar | G06V 40/28 |
| 2017/0111337 A1* | 4/2017 | Saboori | H04L 63/08 |
| 2018/0351956 A1* | 12/2018 | Verma | H04W 12/08 |
| 2019/0028320 A1* | 1/2019 | Xu | H04L 27/362 |
| 2020/0204541 A1 | 6/2020 | Nair | |
| 2020/0272717 A1* | 8/2020 | Figueredo de Santana | G06V 40/172 |
| 2020/0288313 A1* | 9/2020 | Kunz | H04W 12/104 |
| 2020/0344260 A1* | 10/2020 | Dash | H04L 9/0875 |
| 2021/0056188 A1 | 2/2021 | Colon | |
| 2021/0075796 A1 | 3/2021 | Cuan | |
| 2021/0105055 A1* | 4/2021 | Chae | H04L 5/0026 |
| 2021/0226678 A1* | 7/2021 | Zhang | H04B 7/0456 |
| 2021/0294881 A1* | 9/2021 | Moreno | G06F 1/1698 |
| 2022/0035895 A1* | 2/2022 | DiAcetis | H04L 63/08 |
| 2022/0078801 A1* | 3/2022 | Huang | H04W 24/10 |
| 2022/0124154 A1 | 4/2022 | Zou et al. | |
| 2022/0131676 A1* | 4/2022 | Zhang | H04L 5/005 |
| 2022/0225290 A1* | 7/2022 | Ganesan | H04W 72/02 |
| 2022/0283296 A1* | 9/2022 | Zhang | G01S 13/9029 |
| 2022/0329330 A1* | 10/2022 | Merlin | G08B 13/2494 |
| 2022/0394527 A1* | 12/2022 | Mittal | H04B 7/0417 |
| 2023/0072968 A1* | 3/2023 | Bahadori | G01S 5/011 |
| 2023/0088456 A1* | 3/2023 | Ramasamy | G01S 7/006 709/219 |
| 2023/0180002 A1* | 6/2023 | Hwang | H04L 63/062 726/6 |
| 2023/0198592 A1* | 6/2023 | Yapici | H04L 1/08 370/252 |
| 2023/0209325 A1* | 6/2023 | Lee | G06N 3/09 370/338 |
| 2023/0319557 A1* | 10/2023 | Liu | H04W 12/037 455/410 |
| 2024/0061924 A1* | 2/2024 | Colon | G06V 30/32 |
| 2024/0077584 A1* | 3/2024 | Yoo | G01S 7/006 |
| 2024/0187071 A1* | 6/2024 | Li | H04W 24/10 |

OTHER PUBLICATIONS

Germain, Ken St, and Frank Kragh. "Physical-layer authentication using channel state information and machine learning." 2020 14th International Conference on Signal Processing and Communication Systems (ICSPCS). IEEE, 2020.*

Wang, Zhengjie, et al. "A survey of user authentication based on channel state information." Wireless Communications and Mobile Computing 2021.1 (2021): 6636665.*

Song, Yubo, et al. "Enhancing Packet-Level Wi-Fi Device Authentication Protocol Leveraging Channel State Information." Wireless Communications and Mobile Computing 2021.1 (2021): 2993019.*

Liu, Hongbo, et al. "Authenticating users through fine-grained channel information." IEEE Transactions on Mobile Computing 17.2 (2017): 251-264.*

PCT Invitation to Pay Additional Fees mailed Nov. 20, 2023 for PCT Application No. PCT/US2023/028789, 34 pages.

Aleluyaa, et al., "Faceture ID: face and hand gesture multi-factor authentication using deep learning," ScienceDirect, 3rd International Conference on Computer Science and Computational Intelligence, Aug. 2018, 8 pages.

* cited by examiner

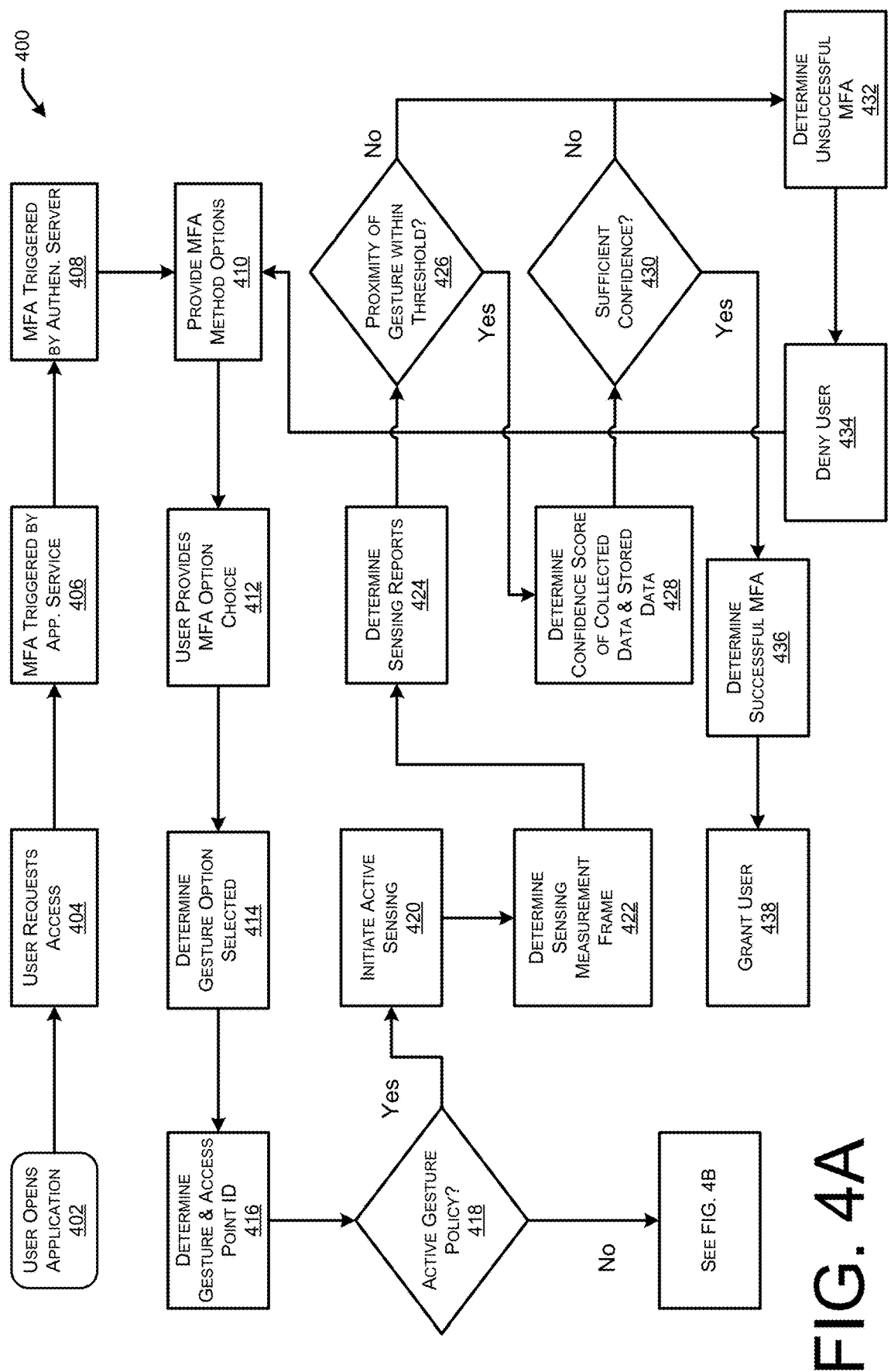

MULTI-FACTOR AUTHENTICATION USING GESTURES

TECHNICAL FILED

The present disclosure relates generally to techniques for gesture-based multi-factor authentication techniques to reduce friction and distraction to a user.

BACKGROUND

Multi-factor authentication (MFA) techniques are becoming increasingly prevalent as a means of procuring access to electronic devices, applications, and the like. MFA is an electronic authentication method in which a user is granted access after successfully presenting two or more pieces of evidence (e.g., factors) to an authentication mechanism. For example, evidence may include presenting knowledge (e.g., something only the user knows), possession (e.g., something only the user has), and/or inherence (e.g., something only the user is). Additionally, third-party authenticator (TPA) apps may be used to enable two-factor authentication, often by showing a randomly generated and frequently changing codes for use for authentication. Techniques for providing the factors and/or through use of a TPA often involve the use of electronic devices. For example, MFA techniques may require a user to confirm a push notification sent to a possession (e.g., a mobile device) of the user (e.g., something only the user has). In cases involving MFA through a user's mobile device(s), mobile devices often require actions to navigate to the push notification. In addition to actions to navigate to the push notification, users are also often confronted with numerous distractions when within their mobile devices such as notifications, social media platforms, personal communications, and the like. As such, MFA techniques do not account for friction (e.g., actions to navigate to the push notification) and/or distractions associated with authentication processes.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 4A illustrates a flow diagram of an example method for authenticating a gesture-based MFA with an active gesture policy enabled, according to aspects of this disclosure.

DESCRIPTION OF EXAMPLE EMBODIMENTS

Overview

Figure 1:
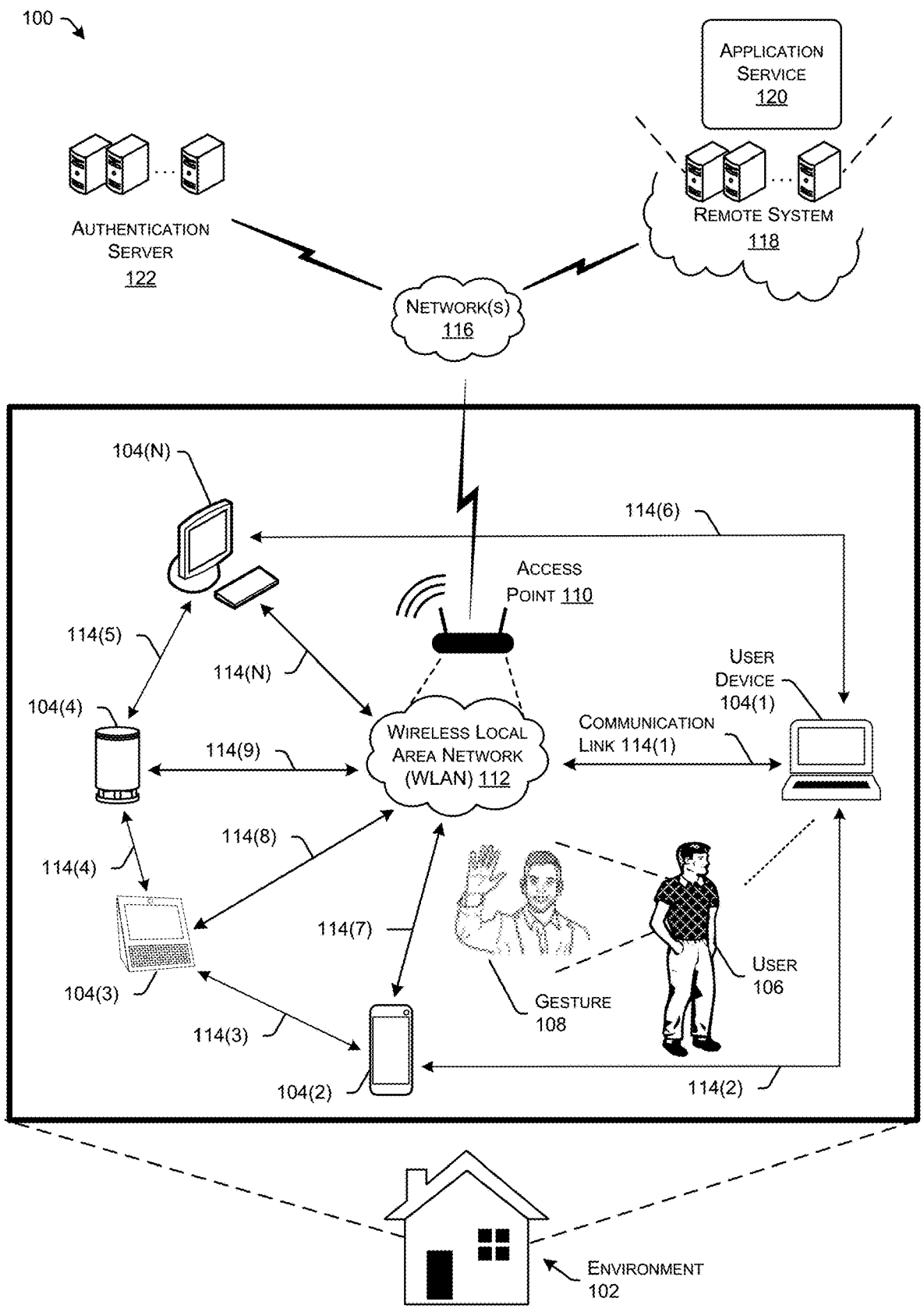
FIG. 1 illustrates a schematic diagram of an illustrative environment in which a user may attempt to access a user device. The user device may establish multiple communication links with other user devices in a same environment including, for example, an access point. The user device and/or the access point is able to determine that the user is making a gesture and is within a certain proximity (e.g., in the same room) to the user device and/or the access point based on detecting the user making the gesture through radio frequency (RF) signals of the multiple of the communication links through monitoring of channel state information (CSI) data.

This disclosure describes techniques for performing multi-factor authentication (MFA) by user a user generated authenticating gesture to reduce authentication friction and inherent distractions associated with conventional MFA methods. A method to perform the techniques described herein includes receiving, at the authentication service and from an application service, a request to perform an authentication of a user attempting to perform an action with respect to the application service. The method may further include determining that the user is registered to authenticate with the authentication service using a predefined authenticating gesture. Further, the method may include sending an instruction to a computing device in an environment of the user to determine whether or not the user made the predefined authenticating gesture. Even further, the method may include receiving, at the authentication service, an indication from the computing device indicating whether the user made the predefined authenticating gesture. As such, the method may, in response to determining that the user did make the predefined authenticating gesture, allow the user to perform the action with respect to the application service or, in response to determining that the user did not make the predefined authenticating gesture, deny the user to perform the action with respect to the application service.

Additionally, or alternatively, another method to perform the techniques described herein includes receiving an instruction from an authentication server to collect channel state information (CSI) data that is indicative of a gesture used for authentication. Additionally, the method may further include collecting the CSI data for communication links established with one or more devices in an environment of the computing device. Even further, the method may include providing a remote system with an indication of the gesture.

Additionally, the techniques described herein may be performed by a system and/or device having non-transitory computer-readable media storing computer-executable instructions that, when executed by one or more processors, performs the method described above.

Example Embodiments

This disclosure describes, in part, techniques for performing multi-factor authentication (MFA) by using a user generated authenticating gesture. MFA is becoming more prevalent as a means of securing access and private data. Further, as work from home increases in adoption, MFA provides a secure way to ensure the security of important work-related data. MFA often involves providing confirmation on a secondary device that is linked and in the possession of a user with access rights. As such, MFA prompts are often populated on a personal electronic device owned by the user. For example, the user may attempt to access an application and/or information with heightened security protocols, the application and/or a remote system may trigger an MFA requirement implicating an authentication server. As such, the user may receive a prompt on their mobile device. The user may then be required to open the mobile device, wait for the prompt, and then approve the prompt before MFA will be authenticated and the user is granted access. The aforementioned steps may take time and/or distract the user from work and/or other actions to be performed by the user. Further, mobile phones often contain a variety of distractions including messages, phone calls, personal emails, social media, notifications, and the like which pose additional distractions. As such, an alternative method and/or technique of performing MFA may reduce distractions.

An alternative method and/or technique of performing MFA to reduce distractions may include user generated gestures. For example, the user may choose to user the user generated gesture as an MFA option. As such, when MFA is triggered, the user may provide a predefined authenticating gesture such as a wave. User generated gestures may allow the user to quickly and efficiently perform MFA by reducing friction created by the multiple steps present in conventional techniques and/or by reducing the likelihood of distraction inherent from use of a personal mobile device. Gestures may be broadly defined to include hand waves, other bodily movement, clapping, other bodily generated sounds, facial recognition, and the like. Additionally, gestures may be defined as passive or active. Passive gestures may be those gestures described above involving the user. Active gestures may include the user performing a gesture with some device. For example, an active gesture may include the user waving their personal mobile device in accordance with the predefined authenticating gesture. Some example devices for active gestures may include personal mobile devices, electronic watches, and the like.

Sensing of the authenticating gestures for MFA may be done by a user device and/or an access point. The sensing may further be conducted using microphones, cameras, and/or any other suitable sensors. However, in a work, home, or other environment, users are often surrounded by a plurality of other electronic devices. As such, authenticating gestures may be sensed by other devices present in an environment of the user by establishing and monitoring peer-to peer communication links between user devices residing in a same physical location. For example, a user may attempt access to and/or take an action on a website, application, and/or the like on the user device that resides in a particular environment, such as a house, may establish communication links over RF signals with multiple other user devices residing in the house. The device may further be in contact with the access point which may be in contact with an application service and/or an authentication server which may trigger MFA following the user's attempt to access the website, application, and/or the like. A gesture-based MFA method may be chosen by the user for authentication purposes. As such, the user device may monitor channel properties for those communication links to detect fluctuations in the channel properties caused by an authenticating gesture made by a user performing the authenticating gesture through portions of the RF signals of the communication links (e.g., a path of an RF signal).

As user devices continue to become more sophisticated, the number of user devices with network capabilities in a house continues to increase. To provide various functionalities to users, user devices often connect to an access point in the house that creates a wireless local area network (WLAN), such as a Wi-Fi network created using a protocol defined in the IEEE 802.11 standard. Thus, user devices residing in different rooms of the house generally establish communication links to the Wi-Fi network created by the access point. The user devices are able to collect channel state information (CSI) data for these communication links that indicates known channel properties of the communication links. Generally, the CSI data describes how the RF signal used for the communication link propagates from the transmitting device to the receiving device. The CSI data represents the combined effect of, for instance, scattering, fading, and power decay of the signal over the transmission distance.

In some examples, the RF signals over which the communication links are established may experience multipath propagation such that the RF signals are transmitted between devices using two or more paths due to reflections, diffraction, and scattering caused by objects in the environment of the devices. So, presence of a moving gesture may cause perturbations in CSI vectors of these RF signals or waves, which can be used to detect presence of an authenticating gesture moving in the environment of the devices. Generally, devices that use Wi-Fi that operate in IEEE 802.11a/g/n/ac use Orthogonal Frequency Division Multiplexing (OFDM) as a modulation scheme with multiple sub-carriers in a Wi-Fi channel to send data. The receiving device may measure a discrete Channel Frequency Response (CFR) in time and frequency as phase and amplitude in the form of CSI data.

Under normal operating conditions, the CSI data representing the properties of the RF signals of the communication links may remain relatively stable. However, when an object, such as the authenticating gesture of the user, moves through a portion of an RF signal of a communication link established between the user device and the access point, the signal of the communication link may experience absorption, refraction, reflection, etc., as it collides with and/or passes through an object, such as the body of the user. The CSI data representing the properties of the communication link may vary when the user walks through the RF signal of the communication link. Thus, a user device is able to monitor CSI data representing properties of RF signals of communication links to determine when users (or other objects) move in proximity to the user devices.

User devices in houses may monitor the CSI data representing properties of RF signals of their respective Wi-Fi communication links with the access point to identify fluctuations caused by the authenticating gesture of the user moving through at least portions of the RF signals of their respective Wi-Fi communication links (e.g., through one path of the RF signal, through multiple paths of the RF signal, etc.). However, user devices are often located large distances from the access points, and may be in different rooms than the access points. Thus, a user device may be able to determine that the user is located somewhere in the house in proximity to the RF signal of the communication link between the user device and the access point, but may be unable to determine how close the user is to the user device versus the access point. That is, the user device may be unable to determine whether the user is in close proximity to the access point, close proximity to the user device, or somewhere in the middle. Accordingly, for purposes of presence detection, monitoring CSI data representing RF signal properties of a Wi-Fi communication link between a user device and an access point may be insufficient for precise presence-detection techniques.

The techniques described herein include user devices establishing Wi-Fi communication links with other user devices in environments to create a "mesh" of Wi-Fi communication links that enable higher-precision presence detection. The user devices may not only establish a communication link with the access point, but may also establish device-to-device communication links with other user devices in the house. Rather than requiring specialized hardware or software, the user devices may simply utilize built-in Wi-Fi radio(s) to establish communication links with the other user devices using, for example, a Wi-Fi peer-to-peer (P2P) protocol, also referred to as Wi-Fi Direct. In this way, the user devices may all establish multiple Wi-Fi communication links to create a mesh of Wi-Fi communication links in the house (or any environment).

The user devices may each be configured to establish Wi-Fi communication links directly with other Wi-Fi-enabled user devices in a house, and monitor the RF signals for those Wi-Fi communication links to detect motion. That is, the user devices may collect CSI data for each of their communication links and detect fluctuations in the CSI data that are indicative of the authenticating gesture through the RF signals of the communication links. In some instances, a user device may determine that CSI data for multiple communication links (e.g., two or more) is indicative of the authenticating gesture through portions of the RF signals of each of the communication links, and determine that the user is moving in close proximity to the user device. The user device can generate a confidence value indicating a likelihood that a user is within a threshold proximity to the user device 104 (such as in a same room). Generally, the higher the number of communication links of a user device that indicate motion, the user device is able to determine a higher the confidence value indicating the likelihood that the user is within the same room as, and/or within a threshold proximity to, the user device. Stated simply, if a user device monitors CSI data and determines that multiple of its communication links indicate motion through portions of the RF signals of those communication links, the user device is able to determine with high confidence that the user is moving around near the user device, such as in the same room as the user device. In some instances, the user devices may be able to unilaterally determine that a user is within a threshold proximity, and take various actions based on determining that the user is in the same room (e.g., turn on lights in the room, open machine-operated blinds in the room, etc.).

Generally, a single user device and/or the access point may operate as a coordinating device (e.g., the device performing the authentication) and may report to one or more downstream services an indication of which user device a user is closest as well as the CSI data collected from the other user devices in the environment. That is, various downstream services may subscribe for the indications of presence detection and receive CSI data, such as an application service, access point, authentication server, etc. The coordinating device may provide these downstream services with indications of where a user's presence was detected and the CSI data collected during performance of the authenticating gesture of the user. However, in instances where the coordinating device is not utilized, the user devices themselves may report when the user device has detected, with a confidence value over a threshold confidence value (e.g., 85% confident, 95% confident, etc.), that a user is within a threshold proximity to the user device and has provided the predefined authenticating gesture.

In examples where the threshold confidence value is based at least in part on determining whether the predefined authenticating gesture has been performed, fluctuations in channel properties for one or more of the communication links may be received by the user device, access point, authentication server, and the like, and comparison of the fluctuations in channel properties may be made to a predefined channel property associated with the authenticating gesture that the user has set and/or is approved. The user device may further determine, because the authenticating gesture of the user was able to move near and/or through a RF signals of the multiple communication links of the user device, a proximity of the user and/or authenticating gesture. As such, the user device may compare the proximity of the user to a predefined proximity threshold value. In this way, the user device, application service, and/or authentication server may determine a confidence value, based at least in part on the comparing the channel properties (e.g., CSI data) to the predefined channel property and/or the comparing the proximity of the user and/or the authenticating gesture to the predefined proximity threshold value. As such, the user device, application service, and/or authentication service may compare the confidence value to a predefined confidence value threshold. Further, the user device, application service, and/or authentication service may determine whether a sufficient match has been made and allow the user access and/or to take the action (e.g., in cases where a sufficient match has been made) or deny the user access and/or to take the action (e.g., in cases where a sufficient match has not been made).

Although the techniques described herein are with reference to determining the position of a user in a house, the techniques are generally applicable to detecting any moving object in any environment in which devices can establishing multiple communication links and/or RF signals, such as Wi-Fi communication links established using protocol defined by an IEEE 802.11 standard. Further, the techniques are described with respect to Wi-Fi communication links, but the techniques may be used for other types of communication protocols or standards as well that are usable to establish communication links over RF signals.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a schematic diagram 100 of an illustrative environment 102 in which access a user device 104(1) and/or any websites, applications, and/or the like on the user device 104(1) may be attempted by a user 106. The user device 104(1) may establish multiple communication links with other user devices 104(1)-104(N) in the environment 102. The user device 104(1) is able to determine that the user 104 is making a gesture 108 and is within a certain proximity (e.g., in the same room) to the user device 106(1) based on detecting the user 106 making the gesture 108 through radio frequency (RF) signals of the multiple of the communication links through monitoring of channel state information (CSI) data.

Generally, the environment 102 may comprise any type of physical environment in which multiple user devices 104 may reside, such as a house, apartment, office building, warehouse, and/or any other structure or building. The user devices 104 may comprise any type of computing device that includes one or more network interfaces usable to communicate using one or more communication protocols. For instance, the user devices 104 may be voice-controlled assistants, tablet computing devices, smart televisions (TVs), laptop computers, desktop computers, mobile phones, display devices, audio devices, gaming devices, and/or the like.

In some examples, the user 106 may attempt to receive access to the user device 104 and/or to websites, applications, and the like within the user device 104. As such, the user device may trigger MFA that requires the gesture 108. For example, the gesture 108 may be required to be performed in order to obtain access and/or obtain permission to perform an action. As such, the user device 104 or other user devices 104 in the environment 102 may collect data associated with an attempted gesture by the user 106. The gesture 108 may include things such as hand waves, handshakes, hand shapes, body movements, head movements, and/or the like. The gesture 108 may further include things such as claps, whistles, voice commands, and/or the like. Additionally, the gesture 108 may be one or more of a combination of the foregoing or any other combination as made become apparent to one skilled in the art in light of this disclosure. In some examples, the user devices 104 may collect data associated with the gesture 108 using cameras, microphones, other sensors, signal changes, and/or the like.

In some examples, the user devices 104 may be communicatively coupled to one or more secondary devices using various communication protocols, such as ZigBee, Bluetooth, LoRa, and the like. In some instances, the secondary devices may not be able to communicate using various protocols, such as Wi-Fi, and be controlled by a user device 104. For instance, the secondary devices may be lights, appliances (e.g., stove, refrigerator, TVs), doorbell devices, etc. Accordingly, the user devices 104 may be configured to control the secondary devices by sending commands over a usable communication protocol, such as Bluetooth, ZigBee, or the like. In other examples, the secondary devices may also be a Wi-Fi-enabled devices and include a W-Fi chipset as well (e.g., Wi-Fi-enabled light bulbs). Thus, the user devices 104 may also establish Wi-Fi communication links with the secondary devices and collect CSI data on those communication links as well to detect motion in proximity to those communication links.

As illustrated, the environment 102 (e.g., house) may include multiple user devices, such as user device 104(1), user device 104(2), user device 104(3), user device 104(4) and user device 104(N) (where "N" is any integer of 2 or greater). As shown, a user device 104 may be accessed directly by the user 106. The environment may further include an access point 110 (e.g., router, switch, hub, etc.) that creates a wireless local area network (WLAN) 112 using a communication protocol, such as Wi-Fi defined by IEEE 802.11. Additionally, a communication link 114 may be established between the user devices 104 and the access point 110 via the WLAN 112. As described herein, establishing a communication link 114 between devices may include performing a handshake as defined by the governing protocol, such as an IEEE 802.11 protocol. Additionally, As described herein, the communication links 114 may be established over signals, such as RF signals.

However, in addition to establishing respective communication links with the access point 110, each user device 104 may establish communication links 114 directly with other user devices 104 in the environment 102. For instance, the user devices 104 may each be configured to detect (e.g., advertisements) other Wi-Fi enabled devices in the environment 102, and utilize a peer-to-peer (P2P) protocol such as Wi-Fi Direct, to establish communication links 114 directly between the user devices 104. In this way, each user device 104 may establish at least two communication links 114 with other devices in the environment 102.

Thus, the user devices 104 may establish Wi-Fi communication links 114 with other user devices in the environment 102 to create a "mesh" of Wi-Fi communication links 114 that enable higher-precision presence detection and/or CSI data collection. The user devices 104 may not only establish a communication link 114 with the access point 110, but may also establish device-to-device communication links with other user devices 104 in the environment 102 to create a mesh of Wi-Fi communication links 114 in the environment 102.

The user devices 104 may monitor those Wi-Fi communication links 114 to detect the gesture 108 (e.g., motion) performed by the user 106. For instance, the user devices 104 may (continuously, periodically, on command, etc.) collect CSI data for each of their communication links 114 and determine whether the CSI data includes fluctuations that are indicative of the gesture 108 being performed by the user 106 through portions of RF signals (e.g., one or more signal paths) of the communication links 114. In some instances, a user device 104(1) may determine that CSI data for multiple communication links 114(1), 114(3), and 114 (4), (e.g., two or more) is indicative of the gesture 108 moving through RF signals of the communication links 114, and further determine that the user 106 is moving in close proximity to the user device 104(1). The user device 104(1) and/or the access point 110 may compare the collected CSI data associated with the gesture 108 and generate a confidence value indicating a likelihood that the gesture 108 matches a saved CSI data associated with a predefined authenticating gesture that the MFA is configured to grant access and/or action to the user 106 based at least in part on performing. Further, the user device 104(1) can generate a confidence value indicating a likelihood that the user 106 is within a predefined threshold proximity value to the user device 104(1), such as in a same room, that the MFA may be further configured to grant access and/or action to the user 106 based at least in part on being within. Generally, the higher the number of communication links 114 of the user device 104(1) that indicate the gesture 108, the user device 104(1) is able to determine a greater likelihood of the gesture 108 matching the predefined authenticating gesture and/or a higher confidence value indicating the likelihood that the user 106 is within the threshold proximity to, the user device 104(1). Stated simply, because the user device 104(1) monitors CSI data and determines that multiple of its communication links 114 indicate motion through their underlying signals, the user device 104(1) is able to determine with high confidence that the user 106 has performed the predefined authenticating gesture properly and/or that the user 106 is performing the gesture 108 around near the user device 104(1) within a predefined threshold proximity (e.g., distance).

In some instances, the user device 104(1) may determine that the user 106 has performed the gesture 108 and/or is in in close proximity as the user device 104(1) despite CSI data for a communication link 114(7) not indicating motion. Thus, in some instances, if CSI data for enough communication links 114 indicate motion, then even if CSI data for the communication link 114(7) does not indicate motion, the user device 104(1) may still be confident enough to determine that the user 106 has performed the gesture 108 and/or is within the within a threshold proximity to the user device 104(1).

In some instances, the user devices 104 may be able to unilaterally determine that the user 106 has made the gesture 108 and/or is within a threshold proximity, and take various actions based on determining that the user has performed the gesture 108 with a sufficient match to the predefined authenticating gesture and/or is within the threshold proximity (e.g., grant access to the user device 104, grant access to a website, grant access to an application, allow action with respect to a website, etc.).

In some examples the user devices 104 may have access to one or more networks 116 through the access point 110. The one or more networks 116 may include any viable communication technology, such as wired and/or wireless modalities and/or technologies. Networks 116 may include any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.) Wide Area Networks (WANs)—both centralized and/or distributed—and/or any combination, permutation, and/or aggregation thereof.

The user devices 104 may access a remote system 118 over the network(s) 126. In some examples, the remote systems 128 may support the user devices 104 and/or be downstream services that enlist for use of the presence-detection techniques described herein.

The remote system 118 may determine the matching between the gesture 108 and the predefined authenticating gesture and/or the location of the user 106 based on the user devices 104 presence-detection techniques, formulate commands for the user devices 104 to perform, determine which of the user devices 104 is to perform an action responsive to the user 106 being in a particular location (e.g., grant access to the user device 104, grant access to a website, grant access to an application, allow action with respect to a website, etc.). The remote system 118 may be implemented as one or more computing devices including one or more servers, desktop computers, laptop computers, or the like. In one example, the remote system 118 is configured in a server cluster, server farm, data center, mainframe, cloud computing environment, or a combination thereof. To illustrate, the remote system 118 may include any number of devices that operate as a distributed computing resource (e.g., cloud computing, hosted computing, etc.) that provides services, such as storage, computing, networking, and so on.

In various examples, the remote system 118 may include one or more processors to power components, devices, and actions of the remote system 118, and one or more network interfaces such as a wireless or Wi-Fi network communications interface, an Ethernet communications interface, a cellular network communications interface, a Bluetooth communications interface, etc., for communications by the remote system 118 over various types of networks 116, including wide-area network, local-area networks, private networks, public networks etc. In the case of a wireless communications interfaces, such interfaces may include radio transceivers and associated control circuits and logic for implementing appropriate communication protocols. The remote system 118 may further include computer-readable media which stores various components, components, or other executable software to perform various arbitration actions to determine which user device 104 is to perform to a command based on the location of the user 106.

In some instances, the user device 104 may communicate over one or more networks 116 via the access point 110 with the remote system 118 that hosts an application service 120. The user device 104 may perform various operations for establishing trust for the remote system 118 and/or the application service 120 (e.g., obtaining credentials), and also register the user device 104 with the application service 120. The user device 104 may provide credentials to the remote system 118 and/or the application service 120, and/or perform other operations for registering the user device 104 with the remote system 118 and/or the application service.

In some instances, the user device 104 may communicate over one or more networks 116 via the access point 110 with an authentication server 122. The user device 104 may perform various operations for establishing trust for the authentication server 122 (e.g., obtaining credentials), and also register the user device 104 with the authentication server. The user device 104 may provide credentials to the authentication server 122 and/or perform other operations for registering the user device 104 with authentication server 122. In some further instances, the user device 104, the remote system 118, and/or the application service 120 may trigger the authentication server 122 to initiate MFA based at least in part on the user 106 attempting to access and/or requesting permission to perform an action requiring authentication. In some instances, the user device 104 and/or the other user devices 104 in the environment 102 may transmit CSI data to the authentication server 122. As such, the authentication server may, in isolation or in combination with the user device 105, access point 110, remote system 118, and/or the application service 120 may compare the collected CSI data to the stored CSI data associated with the predefined authenticating gesture. Further, the authentication server 122 may determine a confidence score indicating a likelihood that the gesture 108 performed by the user 106 matches the predefined authenticating gesture and provide the user 106 access and/or permission to act.

In some further instances, the authentication server may, in isolation or in combination with the user device 105, access point 110, remote system 118, and/or the application service 120 determine a confidence value indicating a likelihood that a user is within the predefined threshold proximity to the user device 104. For example, the predefined threshold proximity may be a maximum distance of 1.5 meters to the user device 104 and/or the access point 110. As such, where the user 106 performs the gesture 108 at a distance greater than 1.5 meters from the user device 104 and/or the access point 110, the authentication server 122 may not grant the user 106 access and/or permission to act.

Figure 2:
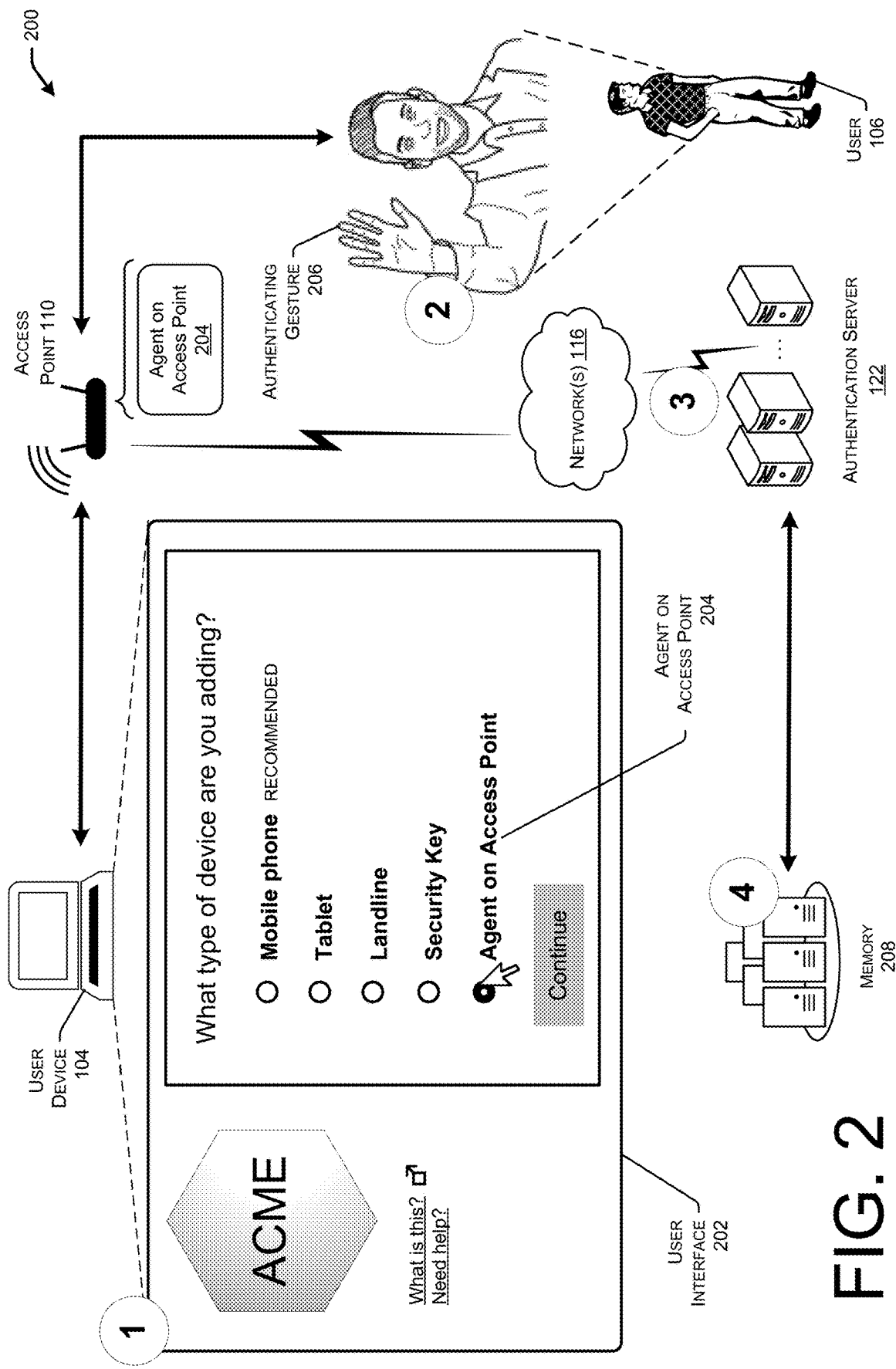
FIG. 2 illustrates an example registration process through which a user can register an access point to enable gesture multi-factor authentication (MFA), according to aspects of this disclosure.

FIG. 2 illustrates an example registration process 200 through which a user 106 can register an access point 110 to enable gesture multi-factor authentication (MFA). The user 106 may access the user device 104 to register the gesture 108, via a user interface 202, and create an authenticating gesture 206 that may enable access and/or permit certain actions associated with the user device 104, websites, applications, and/or the like. The access point may establish an agent on access point (AAP) 204 and proceed with the registration. The user 106 may be prompted to perform the authenticating gesture 206 and the user devices 104 may then monitor CSI data for the communication links 114 to determine whether the user 106 has performed the authenticating gesture 206 through movement through RF signals of their respective communication links 114. Further, the user devices 104 may communicate respective communication link data to the access point 110 in the environment 102 which may further interact with the authentication server 122, via the network 116, which may then store the authenticating gesture 206 in a memory 208.

Referring to number "1," the user 106 may access the user device 104 and be confronted by the user interface 202 detailing options to register a device for MFA purposes. In some instances, the user interface may be initiated by the user 106 directly (e.g., initiating the registration process, etc.). In some other instances, the user interface 202 may be triggered by the user 106 attempting to access the user device 104, a website, an application, attempting to perform an action, and/or the like. As such, the user interface 202 may present the user 106 with a variety of options to register a device for MFA purposes. For example, the user 106 may be presented with device registration options including a mobile phone, a tablet, a landline, a security key, the AAP 204, and/or the like. The user 106 may select one or more options to register a device for MFA purposes. Selection of the AAP 204 may cause the user device 104 to initiate setting up the AAP 204.

Still referring to number "1," the user device 104 may be connected to the access point 110 which may initiate setting up the AAP 204. The access point 110 may be a private server provisioned to communicate securely with the authentication server 122, the application service 120, and/or the like, which may reside in a cloud, and may create an endpoint in a private data center. For example, the access point may create the endpoint in a backend of the user device 104. As such, the access point 110 may enable the authentication server 122, the application service 120, and/or the like to connect to private endpoints securely without requiring the user 104 to open inbound ports.

The AAP 204 may be a software that can be deployed on a variety of enterprise systems, allow the user 104 to connect their private infrastructure (e.g., local and/or remote) with the authentication server 122, application service 120, and/or the like. In some instances, the AAP 204 may connect to a local file system, a Linux share, a Windows UNC path, a database, and/or the like. Further, the AAP 204 may be installed as a part of creating the access point 110. Installation of the access point 110 and/or the AAP 204 may allow the registration process 200 to continue.

Now referring to number "2," the access point 110 and/or the AAP 204 may instruct the user devices 104 to monitor CSI data for the communication links 114. Further, the access point 110 and/or AAP 204 may prompt the user 106 to perform the authenticating gesture 206. As such, the access point 110 and/or agent on access point may determine whether the user 106 has performed the authenticating gesture 206 through movement through RF signals of their respective communication links 114. For example, the access point 110 and/or AAP 204 may measure CSI data collected prior to prompting the user 106 performing the authenticating gesture 206 and compare it to CSI data collected through a specific time period (e.g., 5 seconds, 10 seconds, etc.). As such, the access point 110 and/or AAP 204 may determine whether there were any CSI data fluctuations within that time frame. In some other instances, the access point 110 and/or AAP 204 may direct the user 106 to perform the authenticating gesture 206 more than one time. For example, the access point 110 and/or AAP 204 may collect CSI data associated with the authenticating gesture 206 and may increase its accuracy of identification of the authenticating gesture 206 by collecting CSI data associated with the user 106 performing the authenticating gesture 206 multiple times.

In some other instances, the access point 110 and/or AAP 204 may prompt the user 106 to connect multiple user devices 104 to participate in CSI data collection. For example, the access point 110 and/or AAP 204 may increase accuracy of identifying the authenticating gesture 206 through collection of CSI data from multiple user devices 104. Additionally, the access point 110 and/or AAP 204 may collect further CSI data associated with other user devices 104 for use in authenticating the gesture 108 in situations where other user devices 104 used. In some further instances, the user device 104 may capture the authenticating gesture 206 using pictures, video recording, audio recording, and/or the like. As such, the access point 110 and/or AAP 204 may have additional data associated with the authenticating gesture 206 to use in isolation and/or in combination with CSI data. In some other instances, the access point 110 and/or AAP 204 may use additional data associated with the authenticating gesture 206 (e.g., video) in situations where CSI data collection during MFA is too noisy, collected CSI data is corrupted, and/or the like.

In some further instances, the access point and/or AAP 204 may direct the user 106 to perform the authenticating gesture 206 within a specific distance (e.g., 0.5 m, 1.0 m, etc.) of the access point 110 and/or the user device 104. For example, the specific distance may be included data collected associated with the authenticating gesture 206 and exceeding the specific distance may cause a failed MFA. In some instances, the access point 110 and/or AAP 204 may direct the user 106 to perform the authenticating gesture 206 at multiple distances from the access point 110 and/or the user device 104. As such, the access point 110 and/or AAP 204 may increase the accuracy of identifying the threshold proximity of the authenticating gesture 206 by collecting CSI data associated with the user 106 performing the authenticating gesture 206 at multiple distances. Upon receiving the authenticating gesture 206, the registration process 200 may proceed.

Referring to number "3," the access point 110 and/or the AAP 204 may provide data (e.g., CSI data, video data, audio data, etc.) collected and associated with the authentication gesture 206 to the authentication server 122 via the network 116. For example, the authentication server 122 may be provided with CSI data associated with the authenticating gesture 206 to use when comparing the gesture 108 performed by the user 106 during MFA prompts. As such, the authentication server 122 may use computational algorithms including quicksort, heapsort, shellsort, and/or the like. The authentication server 122 may use machine learning (ML) model(s) to determine matches between the gesture 108 and the authenticating gesture 206. The ML model(s) may include one or more algorithms including supervised, semi-supervised, unsupervised, and/or reinforcement. In some examples, authentication server may utilize machine learning techniques, statistical analysis, or any other means by which a system may be trained to identify likelihoods and/or determine confidence values based on input associated with the gesture 108 and comparison with the authenticating gesture 206. Further, the registration process 200 may, upon receipt of data from the access point 110, user device 104, and/or AAP 204, store that data.

Now referring to number "4," the authentication server 122 may store data received from the user device 104, access point 110, and/or the AAP 204 in a memory 208. The memory 208 may also store program components, program data, and/or one or more operating systems. In some instances, the memory 208 may include volatile and non-volatile memory, removable and non-removable media implemented in any method or technology for storage of information, such as computer-readable instructions, data structures, program component, or other data. Such computer-readable media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device.

Non-transitory computer-readable media storing computer-executable instructions may be implemented as computer-readable storage media ("CRSM"), which may be any available physical media accessible by processor(s) to execute instructions stored on the computer-readable media. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Figure 3:
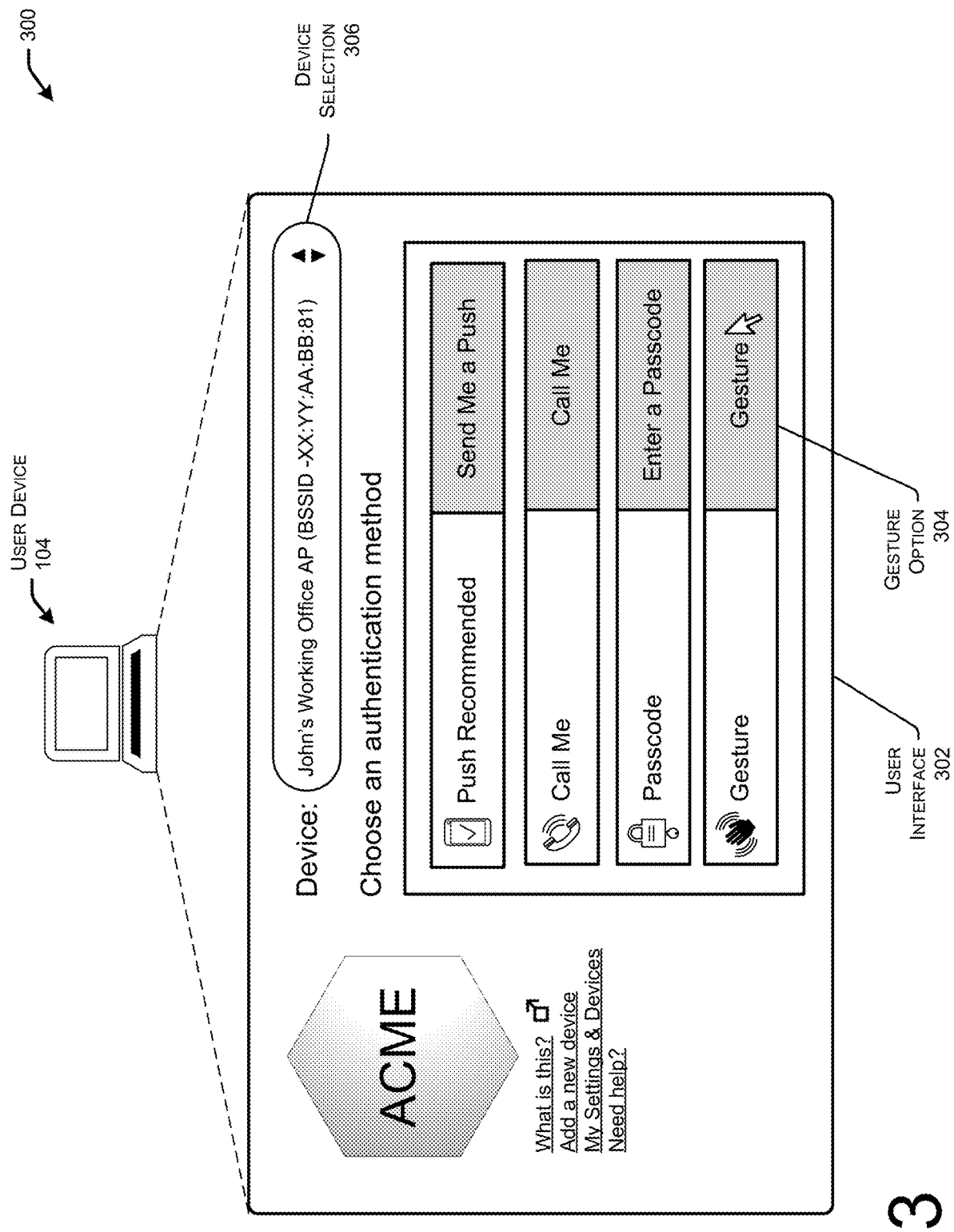
FIG. 3 illustrates an example sign in prompt through which a user can initiate a gesture-based MFA, according to aspects of this disclosure.

FIG. 3 illustrates an example sign-in prompt 300 through which a user 106 can initiate a gesture-based MFA. The user device 104 may be accessed by the user 106 and, prior to being granted access, the user device 104 may display a user interface 302 displaying the example sign-in prompt 300. As such, the user 106 may be presented with a gesture option 304. Selection of the gesture option 304, via the user interface 302, by the user 106 may initiate a gesture-based MFA. Further, the user 106 may provide a device selection 306 which may further yield same and/or similar authentication methods.

In some examples, the user interface 302 may be initiated by the user device 104 and/or the access point 110. In some further examples, the user interface 302 may be initiated by the remote system 118, application service 120, and/or the authentication server 122. The user interface 302 may be initiated when the user 106 attempts to access a website and/or application. For example, the user 106 may attempt to obtain access to a restricted website and/or application which requires MFA. As such, upon attempting access to the restricted website and/or application, the user 106 may be prompted with the example sign-in prompt 300. In some further examples, the user 106 may be prompted with the user interface 302 after a period of inactivity (e.g., 5 min, 10 min, 15 min, etc.) on the restricted website and/or application. For example, the user 106 may have obtained access to the restricted website and/or application and, after some time, proceeded to work on another website and/or application or disengaged from operating within the restricted website and/or application. As such, after a period of inactivity, the restricted website and/or application may sign-out the user 106. Further, upon attempting to sign back into the restricted website and/or application, the user 106 may be prompted to engage in gesture-based MFA via the user interface 302.

In some examples, the user 106 may be presented with the gesture option 304 on the user interface 302. In some instances, the user 106 may have set the gesture option 304 to be selected by default. For example, the user 106 may make the gesture option 304 to be selected by default and triggering of the user interface 302 may be bypassed. In some further instances, triggering of the user interface 302, and selection of the gesture option 304, may be bypassed by a set number of times (e.g., 5 times, 10 times, etc.) before prompting the user 106 again. In some other instances, the gesture option 304 may not be present with every device option within the device selection 306. For example, a first device option may have the gesture option 304 registered while a second device option may not. As such, the gesture option 304 may be present when the first device option is selected from the device selection 306 while not when the second device option is selected. In some other examples, the gesture option 304 may always be present. In such examples, the gesture option 304 may redirect the user 106 to register the device option from the device selection 306 to user gesture-based MFA. Once the gesture option 304 has been selected in accordance with a registered device option within the device selection, the gesture-based MFA may proceed.

Figure 4B:
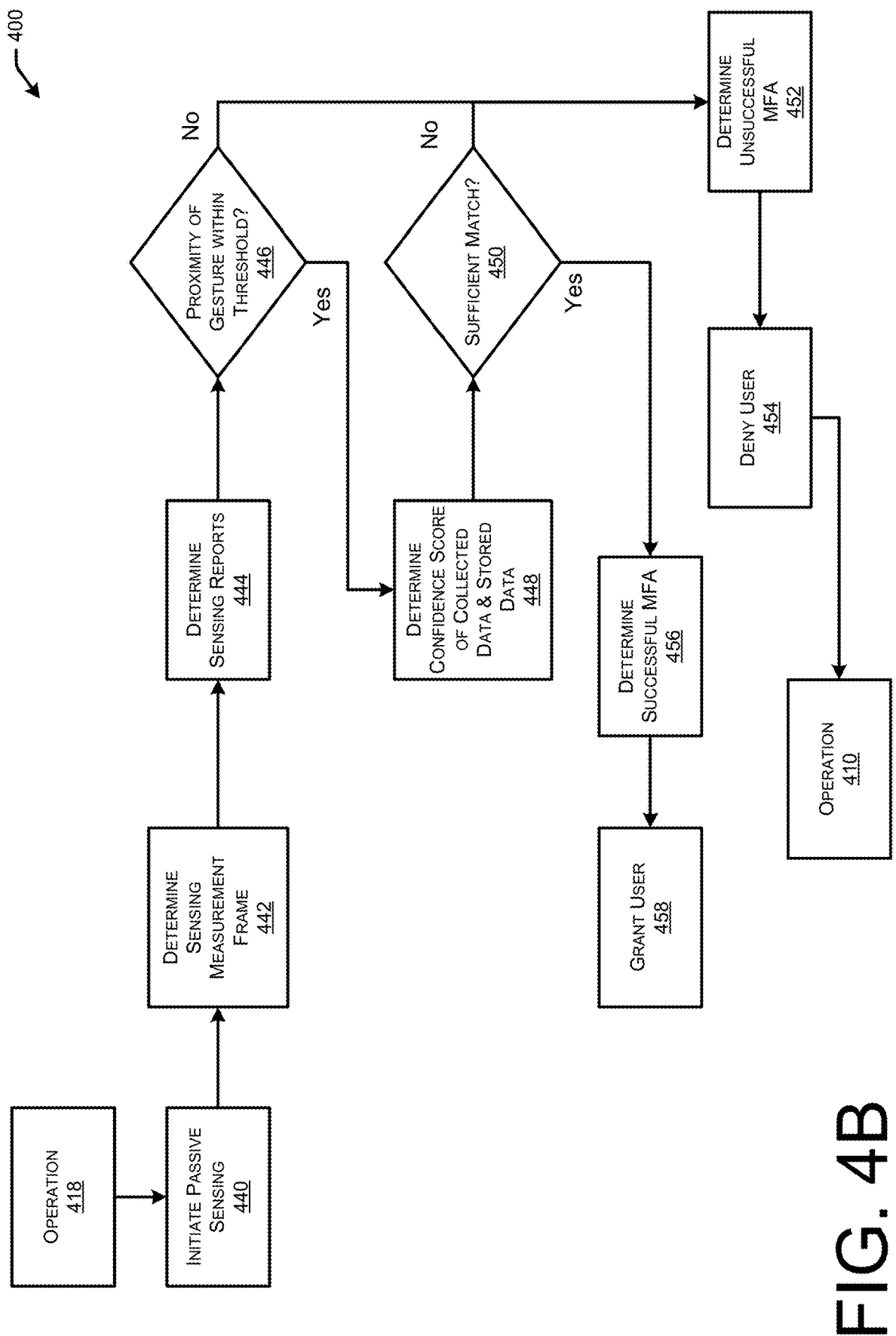
FIG. 4B illustrates a flow diagram of an example method for authenticating a gesture-based MFA, continuing from FIG. 4A, with a passive gesture policy enabled, according to aspects of this disclosure.

FIGS. 4A and 4B flow diagram of an example methods 400 for authenticating a gesture-based MFA. The user 106 may access the user device 104, websites, applications, and/or attempt to take action with respect to the user device 104, website, and/or applications which may initiate the example methods 400. Further, within the example methods 400, user devices 104 establish multiple communication links 114 with other user devices 104 in the same physical environment 102. The user devices 104 may then monitor CSI data for the communication links 114 to determine whether the user 106 moved their gesture 108 through RF signals of their respective communication links 114. Further, the user devices 104 may communicate respective communication link data to the user device 104, other user devices 104, access point 110, application service 120, and/or authentication server 122 that may make an overall decision as to whether the gesture 108 matches the authenticating gesture 206 and whether the gesture 108 was made within the proximity threshold value.

At 402 in FIG. 4A, the user 106 may open an application within the user device 104. In some other instances, the user 106 may open a website and/or the user device 104 itself.

At 404, the user 106, via the user device 104, may request access to the application. In some other instances, the user 106 may request access to a website and/or the user device 104. The access request by the user 106 may run through the access point 110 and/or the agent on AAP 204. For example, the user 106 may attempt to request access on the user device 104. The request may pass through the access point and/or agent on AAP 204 via the communication link 114(1). As such, the access point 110 and/or agent on AAP 204 may pass on the request for access to the application service 120 and/or the authentication server 122 via the network 116.

At 406, the MFA may be triggered by the remote system 118 and/or the application service 120. As described and alluded to above, the user device 104 may pass on the access request by the user 106 to the remote system 118 and/or the application service 120. As such, the remote system 118 and/or application service 120 may initiate the MFA. For example, the access request received by the remote system 118 and/or the application service may determine that the request may include restrictions requiring MFA. As such, the remote system 118 and/or the application service 120 may, via the network 116, trigger MFA.

At 408, the MFA may be triggered by the authentication server 122. For example, at 406, the remote system 118 and/or the application service 120 may trigger MFA and may further communicate the MFA trigger to the authentication server 122 via the network 116. As such, the authentication server 122 may become activated to further trigger MFA.

At 410, the authentication server 122 may provide MFA method options to the user 106. For example, at 408, the authentication server 122 may become activated and trigger MFA. As such, the authentication server may, via the network 116, WLAN 112, and/or the communication links 114, provide the user 106 with MFA method options such as via the user interface 302.

At 412, the user 106 may select (e.g., provide) an MFA option choice. For example, the user 106 may be prompted with the user interface 302 including the device selection 306 and/or the gesture option 304 among other MFA options. As such, the user 106 may select the MFA option choice from the user device 104 which may be communicated to the user device 104, access point 110, agent on AAP 204, remote system 118, authentication server 122, and/or the like.

At 414, the method 400 may determine (e.g., via the application service 120, authentication server 122, etc.) the gesture option selected. For example, the user may select an MFA option including the gesture option 304, a push notification, a phone call, a passcode, or the like. As such, the authentication server 122, for example, may receive the gesture option selected to further determine next actions associated with the gesture option choice.

At 416, where the gesture option is selected, the method 400 may determine gesture and access point IDs. For example, the method 400 may receive the gesture option selection and then determine the gesture ID associated with the authenticating gesture 206. Additionally, the method 400 may receive the device selection 306 (e.g., the access point 110) and determine the access point ID. As such, the method 400 may determine a matched gesture and access point IDs to authenticate gesture 108 provided for MFA.

At 418, the method 400 may determine whether an active gesture policy is in effect, selected, etc. For example, the active gesture policy may entail the user 106 performing the gesture 108 while holding one or more of the user devices 104. In some instances, holding the user device 104 may provide additional accuracy to data associated with the gesture 108. For example, the user 106 may hold a mobile device and perform the gesture 108. As such, the authentication server 122 may utilize sensors, in addition or in isolation, to collected CSI data, video data, audio data, etc. to authenticate the gesture 108. In some instances, specific devices may be registered to be performed with the gesture 108. In such instances, performing the gesture 108 without the registered device may not authenticate the MFA. The user devices 104 that may be used under the active gesture policy may include mobile devices, smart watches, tablets, and/or the like.

Where the method 400 determines that the active gesture policy is in effect (e.g., a "Yes" at operation 418, the method 400 may proceed to operation 420.

At operation 420, the method 400 may initiate active sensing, where the method 400 senses for the gesture 108 being performed as an active gesture as described and alluded to above. As such, each of the user devices 104 may establish communication links 114 with other devices using an IEEE 802.011 protocol. For instance, the user devices 104 may utilize Wi-Fi Direct to connect to the user devices 104.

At 420, the user devices 104 may each collect CSI data for the communication links 114. For instance, the user devices 104 periodically or continuously sample CSI data for the communication links 114.

At operation 422, the method 400 may determine a sensing measurement frame. For example, the method 400 may collect data (e.g., CSI data) from the user device 104 and/or the other user device 104 periodically or continuously. Additionally, or alternatively, the method 400 may collect data for a period of time (e.g., 5 seconds, 10 seconds, etc.) In some instances, the method 400 may determine the sensing measurement frame to include a period of time and a start point. For example, the method 400 may determine the sensing measurement frame to go for a period of 5 seconds and have the start point begin when the user 106 provides the MFA option choice (e.g., at operation 412). In some other instances, the method 400 may determine the start point to begin at operation 422. In other words, there may be a time delay between the user 106 providing the MFA option choice (e.g., at operation 412) and the start point beginning at operation 422 when intermediary operations of the method 400 have been performed.

In some other instances, the sensing measurement frame may be determine based at least in part on the authenticating gesture 206. For instance, the authenticating gesture 206 may be complex, take a long time to perform, need to be performed multiple times, and/or the like. As such, the sensing measurement frame may be lengthened, initiated multiple times, and/or the like. For example, the authenticating gesture 206 may be required to be performed more than one time. In such instances, the sensing measurement frame may have a set time duration associated with each initiation, have multiple initiations, and may further initiate instantaneously or with a set time delay.

At 424, the method 400 may determine the sensing reports. As such, the user devices 104 may determine whether each communication link 114 indicates motion of the gesture 108 through a respective RF signal. In some instances, the user devices 104 may establish a baseline of what CSI data represents in situations where an object is not moving through the RF signals of the respective communication links 114. The user devices 104 may then determine if fluctuations in the CSI data are greater than or equal to a threshold variance from the baseline (e.g., greater than 10% variance, greater than 25% variance, etc.). As such, the user devices 104 may have determined that the user 106 passed through RF signals of communication links 114 and tagged the collected CSI data with an active indication tag, but not through RF signals of communication links 114 tagged with a null indication tag.

Further, the user 106 (e.g., the gesture 108) need not necessarily move through a line-of-sight (LoS) path of a communication link 114 for that communication link 114 to experience fluctuations in the collected CSI data. Thus, if the user 106 moves within a threshold proximity to a LoS of the communication link 114 (e.g., within 10 feet, within 5 feet, etc.), the CSI data for that communication link 114 may fluctuate to indicate motion of the gesture 108 through one of the signal paths of the RF signal. As such, the gesture 108 of the user 106 does not pass through the LoS of the communication link 114(1). However, the communication link 114(1) may still have active indication tag, indicating that the collected CSI data for the link still experienced fluctuations caused by the gesture 108 moving through at least one signal path of an RF signal of the communication link 114(1).

Generally, the collected CSI data for the communication links 114 may comprise a complex number having an amplitude and phase value for each sample collected over time. The collected CSI data may be collected over a period of time (e.g., one second, ten seconds, one minute, etc.) The magnitude or amplitude portion of the collected CSI data generally indicates a strength of the signal for the communication links 114, and the phase generally represents propagation characteristics of the signal, such as propagation delay or propagation paths. Generally, the wireless signals of the communication links 114 have a multi-path effect where the signals take multiple paths through the environment and between the devices that established the communication links 114. Thus, even is a user 106 (e.g., the gesture 108) does not move directly in the LoS path of a communication link 114, the movement of the gesture 108 may still be represented as fluctuations in the collected CSI data because the user 106 interferes with paths of the signal propagating through the environment. Thus, as long as a user 106 is moving through a path of an RF signal of a communication link 114 (e.g., in the same room, within 5 feet, within 10 feet, etc.), the CSI data for that communication link 114 may fluctuate due to the movement of the user 106.

The materials of the gesture 108 that are in motion may cause different fluctuations in the CSI data. For instance, where the user 106 is performing the gesture 108 while wearing gloves, the signals of the communication links 114 may have reduced amplitude due to the gloves absorbing the some of the signals, thereby reducing the strength of the signals. When the gesture 108 is moving, there may be fluctuations in the magnitude/amplitude as well as the phase for the CSI data samples. Because the signals traverse different paths or lengths, those translate into different phases and movement of a user 106 through those different paths may cause fluctuations in the phase values for the CSI data.

Thus, fluctuations in CSI data, which may be positive fluctuations, or negative fluctuations, generally indicate movement of the gesture 108 through paths of RF signals of the communication links 114. In some instances, the user devices 104 may determine whether the values in the CSI data fluctuate by more than a threshold amount that indicates, with a high level of confidence, that an object is moving through an RF signal of the communication link 114.

At 426, the method 400 may determine whether the proximity of the gesture 108 is performed within a predefined proximity threshold value. In some instances, the user devices 104 may further determine confidence values indicating how likely it is that the user 106 is in close proximity to the user devices 104. As illustrated, the user device 104(1) may have a high confidence positive that the user 106 is in close proximity to the user device 104(1) as three of the user device's 104(1) communication links detected motion. Further, user devices 104(2) and 104(3) have low confidence positives because only one communication link 114 out of the communication links 114 for those devices 104(2) and 104(3) had collected CSI data indicating motion. Finally, the user device 104(N) may determine that the CSI data for its respective communication links 114 do not indicate motion at all, and thus has a high confidence negative as the user device 104 is very confident the user 106 is not within close enough proximity, within the environment 102, of the user device 104(N).

As such, the method may compare the collected CSI data from the user devices 104 to the predefined proximity threshold value and determine a confidence value associated with a likelihood that the gesture 108 was performed within the predefined proximity threshold value. The predefined proximity threshold value may be a distance (e.g., 2 feet, 4 feet, 10 feet, etc.) that the user 106 may perform the gesture 108 within to successfully authenticate the MFA. The distance may be measure from the user device 104 being used, access point, and/or any other configuration of distance suitable to authenticate the MFA.

Where the method 400 determines that the gesture 108 was performed within the predefined proximity threshold value (e.g., a "Yes" at operation 426), the method 400 may proceed to operation 428.

At 428, the method 400 determines a confidence score indicating a likelihood that the collected CSI data associated with the gesture 108 performed by the user 106 matches the stored CSI data associated with the authenticating gesture 206. For example, the user device 104, access point 110, remote system 118, authentication server 122, agent on AAP 204, and/or the like may compare fluctuations measured in the collected CSI data from the user devices 104 to the stored CSI data that was collected during the registration process as illustrated by FIG. 2. As such, the stored CSI data may include specific fluctuations associated with the authenticating gesture. 206. Further, the memory 208 may be accessed by the authentication server 122 to retrieve the stored CSI data. In such instances, the authentication server may compare the stored CSI data to the collected CSI data to determine a confidence score indicating a likelihood of a match between the fluctuations of the stored CSI data and the collected CSI data.

In some other instances, the user device may collect video and/or audio associated with the authenticating gesture 206 and/or as their own, independent authenticating gestures 206. In some further instances, the authenticating server 122 may determine a confidence score while using collected CSI data as collected by the user devices 104.

In some examples, the authentication server 122 may determine whether each communication link 114 indicates motion and/or other characteristics of the gesture 108 through a respective RF signal. In some instances, the authenticating server 122 may establish a baseline of what the stored CSI data represents in situations where the collected CSI data is not perfectly matched to the stored CSI data. The authentication server 122 may then determine if fluctuations in the collected CSI data are greater than or equal to a threshold variance from the baseline (e.g., greater than 10% variance, greater than 25% variance, etc.). As such, the authentication server 122 may have determined that the collected CSI data is within an acceptable variance to be considered matched to the stored CSI data associated with the authenticating gesture.

At 430, the method 400 determines whether a sufficient confidence value has been determined from information and/or data collected at operation 428. In such instances, the method 400 may make a determination as to whether there is a sufficient confidence value has been determined. For example, the method 400 may use the determination made at operation 428 as to the confidence score of a match between the collected CSI data and the stored CSI data. As such, the method 400 may compare the confidence score determined at operation 428 to a predefined confidence score. In such instances, if the confidence score determined at operation 428 is equal to or greater than the predefined confidence score, the method 400 may determine that there is sufficient confidence that the gesture 108 performed by the user 106 matches the authenticating gesture 206 to authenticate (e.g., satisfy) the MFA.

Where the method 400 determines that the gesture 108 was not performed within the predefined proximity threshold value (e.g., a "No" at operation 426), the method 400 may proceed to operation 432. Further, where the method 400 determines that there is not a sufficient match between the data collected and determined at operation 428 (e.g., a "No" at operation 430), the method 400 may also proceed to operation 432.

At 432, the method 400 may determine that, based at least in part on operations 426 and 430, that the MFA was unsuccessful. For example, the method 400 may determine, at operation 426, that the gesture 108 was performed in excess of the predefined proximity threshold value. As such, the method 400 may determine that the gesture 108 does not satisfy the MFA requirements and determine that the MFA was unsuccessful at operation 432. In some other instances, the user 106 may have performed the gesture 108 within the predefined proximity threshold value but the method 400 may still determine an unsuccessful MFA. For example, the confidence score determined at operation 428 may not match or exceed the predefined confidence score and thus the gesture 108 may be deemed insufficient at operation 430. As such, the method 400 may determine that the gesture 108 performed by the user 104 does not likely match the authenticating gesture 206 and thus result in an unsuccessful MFA.

At 434, the method 400 may deny the user 106 from the access requested at operation 404. As such, the method 400 may redirect the user 106 back to operation 410 where the user 106 may reinitiate the MFA process by selecting the same or different MFA method option.

Where the method 400 determines that there is a sufficient match between the data collected and determined at operations 426 and 428 (e.g., a "Yes" at operation 430), the method 400 may proceed to operation 436.

At 436, the method 400 may determine that, based at least in part on operation 430, that the MFA was successful. For example, the confidence score determined at operation 428 may have matched or exceed the predefined confidence score and thus the gesture 108 may be deemed sufficient at operation 430. As such, the method 400 may determine that the gesture 108 performed by the user 104 likely matches the authenticating gesture 206 and thus result in a successful MFA.

At 438, the method 400 may grant the user 106 the access requested at operation 404. As such, the method 400 may terminate once the user 106 is granted access and/or terminate until the user 106 requests access to another MFA restricted action and/or access.

Where the method 400 determines that the active gesture policy is not in effect (e.g., a "No" at operation 418), the method may proceed to the operations as illustrated in FIG. 4B.

Referring now to FIG. 4B, at 440 the method 400 may have proceeded from operation 418. As such, operation 418 may have determined that no active gesture policy is in place. In other words, it may be determined that a passive gesture policy has been implemented. In such instances, the method 400 may determine the gesture 108 performed by the user 106 without the presence of additional devices as described and alluded to above. For example, the method 400 may proceed to determine the gesture 108 as a hand wave, head shake, body movement, voice sound, clap, visual sign, and/or the like without the presence of a user device 104 (e.g., a mobile device, smart watch, etc.). As such, performing the gesture 108 without an additional user device 104 may reduce accuracy of determining the gesture 108 and/or determining a match to the authenticating gesture 206. In some other instances, performing the gesture 108 without an additional user device 104 may reduce friction and/or the potential for distraction associated with the MFA.

Additionally, at operation 440, each of the user devices 104 may establish communication links 114 with other devices using an IEEE 802.011 protocol. For instance, the user devices 104 may utilize Wi-Fi Direct to connect to the user devices 104. At 440, the user devices 104 may each collect CSI data for the communication links 114. For instance, the user devices 104 periodically or continuously sample CSI data for the communication links 114.

At operation 442, the method 400 may determine a sensing measurement frame. For example, the method 400 may collect data (e.g., CSI data) from the user device 104 and/or the other user device 104 periodically or continuously. Additionally, or alternatively, the method 400 may collect data for a period of time (e.g., 5 seconds, 10 seconds, etc.) In some instances, the method 400 may determine the sensing measurement frame to include a period of time and a start point. For example, the method 400 may determine the sensing measurement frame to go for a period of 5 seconds and have the start point begin when the user 106 provides the MFA option choice (e.g., at operation 412). In some other instances, the method 400 may determine the start point to begin at operation 422. In other words, there may be a time delay between the user 106 providing the MFA option choice (e.g., at operation 412) and the start point beginning at operation 442 when intermediary operations of the method 400 have been performed.

In some other instances, the sensing measurement frame may be determine based at least in part on the authenticating gesture 206. For instance, the authenticating gesture 206 may be complex, take a long time to perform, need to be performed multiple times, and/or the like. As such, the sensing measurement frame may be lengthened, initiated multiple times, and/or the like. For example, the authenticating gesture 206 may be required to be performed more than one time. In such instances, the sensing measurement frame may have a set time duration associated with each initiation, have multiple initiations, and may further initiate instantaneously or with a set time delay.

At 444, the method 400 may determine the sensing reports. As such, the user devices 104 may determine whether each communication link 114 indicates motion of the gesture 108 through a respective RF signal. In some instances, the user devices 104 may establish a baseline of what CSI data represents in situations where an object is not moving through the RF signals of the respective communication links 114. The user devices 104 may then determine if fluctuations in the CSI data are greater than or equal to a threshold variance from the baseline (e.g., greater than 10% variance, greater than 25% variance, etc.). As such, the user devices 104 may have determined that the user 106 passed through RF signals of communication links 114 and tagged the collected CSI data with an active indication tag, but not through RF signals of communication links 114 tagged with a null indication tag.

Further, the user 106 (e.g., the gesture 108) need not necessarily move through a line-of-sight (LoS) path of a communication link 114 for that communication link 114 to experience fluctuations in the collected CSI data. Thus, if the user 106 moves within a threshold proximity to a LoS of the communication link 114 (e.g., within 10 feet, within 5 feet, etc.), the CSI data for that communication link 114 may fluctuate to indicate motion of the gesture 108 through one of the signal paths of the RF signal. As such, the gesture 108 of the user 106 does not pass through the LoS of the communication link 114(1). However, the communication link 114(1) may still have active indication tag, indicating that the collected CSI data for the link still experienced fluctuations caused by the gesture 108 moving through at least one signal path of an RF signal of the communication link 114(1).

Generally, the collected CSI data for the communication links 114 may comprise a complex number having an amplitude and phase value for each sample collected over time. The collected CSI data may be collected over a period of time (e.g., one second, ten seconds, one minute, etc.) The magnitude or amplitude portion of the collected CSI data generally indicates a strength of the signal for the communication links 114, and the phase generally represents propagation characteristics of the signal, such as propagation delay or propagation paths. Generally, the wireless signals of the communication links 114 have a multi-path effect where the signals take multiple paths through the environment and between the devices that established the communication links 114. Thus, even is a user 106 (e.g., the gesture 108) does not move directly in the LoS path of a communication link 114, the movement of the gesture 108 may still be represented as fluctuations in the collected CSI data because the user 106 interferes with paths of the signal propagating through the environment. Thus, as long as a user 106 is moving through a path of an RF signal of a communication link 114 (e.g., in the same room, within 5 feet, within 10 feet, etc.), the CSI data for that communication link 114 may fluctuate due to the movement of the user 106.

The materials of the gesture 108 that are in motion may cause different fluctuations in the CSI data. For instance, where the user 106 is performing the gesture 108 while wearing gloves, the signals of the communication links 114 may have reduced amplitude due to the gloves absorbing the some of the signals, thereby reducing the strength of the signals. When the gesture 108 is moving, there may be fluctuations in the magnitude/amplitude as well as the phase for the CSI data samples. Because the signals traverse different paths or lengths, those translate into different phases and movement of a user 106 through those different paths may cause fluctuations in the phase values for the CSI data.

Thus, fluctuations in CSI data, which may be positive fluctuations, or negative fluctuations, generally indicate movement of the gesture 108 through paths of RF signals of the communication links 114. In some instances, the user devices 104 may determine whether the values in the CSI data fluctuate by more than a threshold amount that indicates, with a high level of confidence, that an object is moving through an RF signal of the communication link 114.

At 446, the method 400 may determine whether the proximity of the gesture 108 is performed within a predefined proximity threshold value. In some instances, the user devices 104 may further determine confidence values indicating how likely it is that the user 106 is in close proximity to the user devices 104. As illustrated, the user device 104(1) may have a high confidence positive that the user 106 is in close proximity to the user device 104(1) as three of the user device's 104(1) communication links detected motion. Further, user devices 104(2) and 104(3) have low confidence positives because only one communication link 114 out of the communication links 114 for those devices 104(2) and 104(3) had collected CSI data indicating motion. Finally, the user device 104(N) may determine that the CSI data for its respective communication links 114 do not indicate motion at all, and thus has a high confidence negative as the user device 104 is very confident the user 106 is not within close enough proximity, within the environment 102, of the user device 104(N).

As such, the method may compare the collected CSI data from the user devices 104 to the predefined proximity threshold value and determine a confidence value associated with a likelihood that the gesture 108 was performed within the predefined proximity threshold value. The predefined proximity threshold value may be a distance (e.g., 2 feet, 4 feet, 10 feet, etc.) that the user 106 may perform the gesture 108 within to successfully authenticate the MFA. The distance may be measure from the user device 104 being used, access point, and/or any other configuration of distance suitable to authenticate the MFA.

Where the method 400 determines that the gesture 108 was performed within the predefined proximity threshold value (e.g., a "Yes" at operation 446), the method 400 may proceed to operation 448.

At 448, the method 400 determines a confidence score indicating a likelihood that the collected CSI data associated with the gesture 108 performed by the user 106 matches the stored CSI data associated with the authenticating gesture 206. For example, the user device 104, access point 110, remote system 118, authentication server 122, agent on AAP 204, and/or the like may compare fluctuations measured in the collected CSI data from the user devices 104 to the stored CSI data that was collected during the registration process as illustrated by FIG. 2. As such, the stored CSI data may include specific fluctuations associated with the authenticating gesture. 206. Further, the memory 208 may be accessed by the authentication server 122 to retrieve the stored CSI data. In such instances, the authentication server may compare the stored CSI data to the collected CSI data to determine a confidence score indicating a likelihood of a match between the fluctuations of the stored CSI data and the collected CSI data.

In some other instances, the user device may collect video and/or audio associated with the authenticating gesture 206 and/or as their own, independent authenticating gestures 206. In some further instances, the authenticating server 122 may determine a confidence score while using collected CSI data as collected by the user devices 104.

In some examples, the authentication server 122 may determine whether each communication link 114 indicates motion and/or other characteristics of the gesture 108 through a respective RF signal. In some instances, the authenticating server 122 may establish a baseline of what the stored CSI data represents in situations where the collected CSI data is not perfectly matched to the stored CSI data. The authentication server 122 may then determine if fluctuations in the collected CSI data are greater than or equal to a threshold variance from the baseline (e.g., greater than 10% variance, greater than 25% variance, etc.). As such, the authentication server 122 may have determined that the collected CSI data is within an acceptable variance to be considered matched to the stored CSI data associated with the authenticating gesture.

At 450, the method 400 determines whether a sufficient confidence value has been determined from information and/or data collected at operation 448. In such instances, the method 400 may make a determination as to whether there is a sufficient confidence value has been determined. For example, the method 400 may use the determination made at operation 448 as to the confidence score of a match between the collected CSI data and the stored CSI data. As such, the method 400 may compare the confidence score determined at operation 448 to a predefined confidence score. In such instances, if the confidence score determined at operation 448 is equal to or greater than the predefined confidence score, the method 400 may determine that there is sufficient confidence that the gesture 108 performed by the user 106 matches the authenticating gesture 206 to authenticate (e.g., satisfy) the MFA.

Where the method 400 determines that the gesture 108 was not performed within the predefined proximity threshold value (e.g., a "No" at operation 446), the method 400 may proceed to operation 452. Further, where the method 400 determines that there is not a sufficient match between the data collected and determined at operation 448 (e.g., a "No" at operation 450), the method 400 may also proceed to operation 452.

At 452, the method 400 may determine that, based at least in part on operations 446 and 450, that the MFA was unsuccessful. For example, the method 400 may determine, at operation 446, that the gesture 108 was performed in excess of the predefined proximity threshold value. As such, the method 400 may determine that the gesture 108 does not satisfy the MFA requirements and determine that the MFA was unsuccessful at operation 452. In some other instances, the user 106 may have performed the gesture 108 within the predefined proximity threshold value but the method 400 may still determine an unsuccessful MFA. For example, the confidence score determined at operation 448 may not match or exceed the predefined confidence score and thus the gesture 108 may be deemed insufficient at operation 450. As such, the method 400 may determine that the gesture 108 performed by the user 104 does not likely match the authenticating gesture 206 and thus result in an unsuccessful MFA.

At 454, the method 400 may deny the user 106 from the access requested at operation 404. As such, the method 400 may redirect the user 106 back to operation 410 where the user 106 may reinitiate the MFA process by selecting the same or different MFA method option.

Where the method 400 determines that there is a sufficient match between the data collected and determined at operations 446 and 448 (e.g., a "Yes" at operation 450), the method 400 may proceed to operation 456.

At 456, the method 400 may determine that, based at least in part on operation 450, that the MFA was successful. For example, the confidence score determined at operation 448 may have matched or exceed the predefined confidence score and thus the gesture 108 may be deemed sufficient at operation 450. As such, the method 400 may determine that the gesture 108 performed by the user 104 likely matches the authenticating gesture 206 and thus result in a successful MFA.

At 458, the method 400 may grant the user 106 the access requested at operation 404. As such, the method 400 may terminate once the user 106 is granted access and/or terminate until the user 106 requests access to another MFA restricted action and/or access.

FIGS. 5, 6, 7, and 8 illustrate flow diagrams of example methods 500, 600, 700, and 800 for performing presence-detection and authentication techniques using multiple communication links 114 as described herein. These methods are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

In some examples, the techniques of methods/processes 500 and 600 may be performed by the user device 104, the access point 110, the remote system 118, the application service 120, the authentication server 122, and/or the agent on AAP 204. The device described above may include one or more processors and computer-readable media storing computer-executable instructions (e.g., components in the computer-readable media) that, when executed by the one or more processors, cause the one or more processors to perform operations of the methods/processes.

Figure 5:
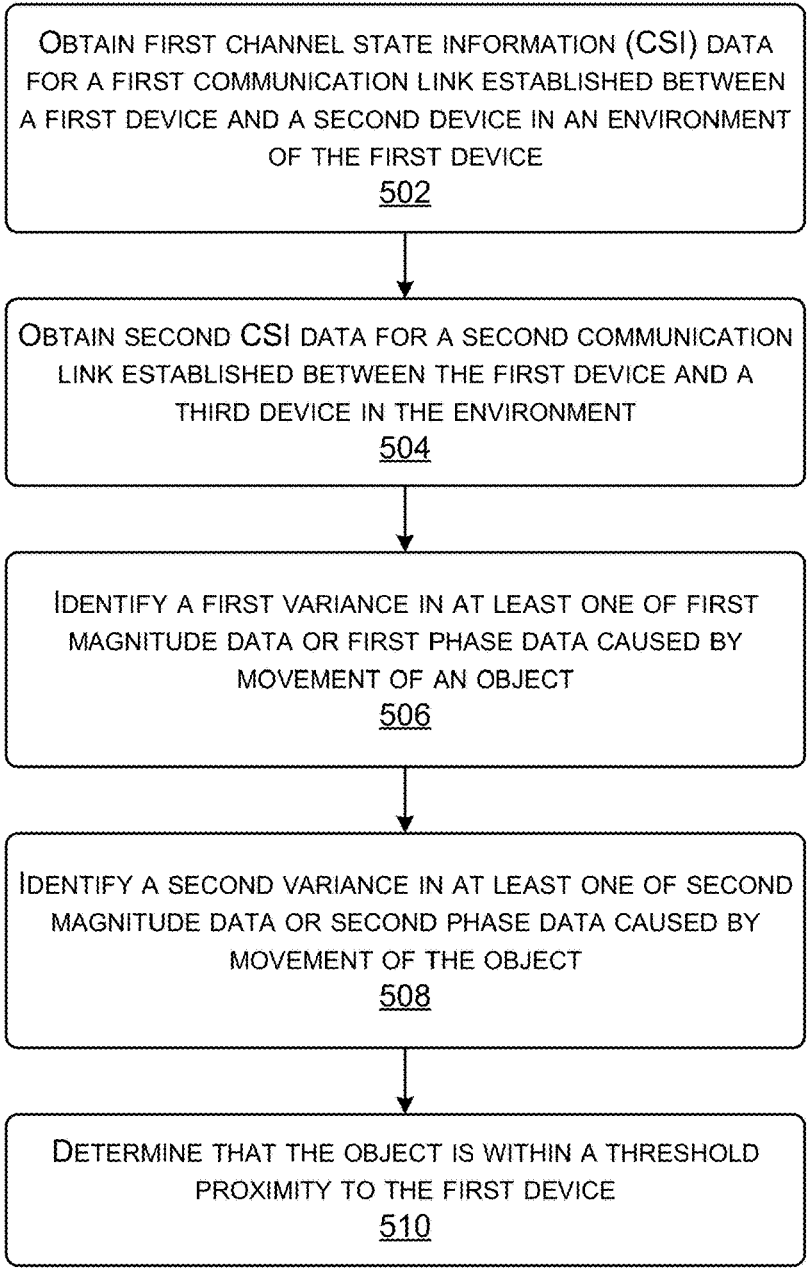
FIG. 5 illustrates a flow diagram of an example method for performance of presence-detection techniques, according to aspects of this disclosure.

FIG. 5 illustrates a flow diagram of an example method 500 for performance of presence-detection techniques by monitoring multiple communication links 114 and determining location data for the gesture 108 based on monitoring the communication links.

At 502, the first device 104(1) may obtain first channel state information (CSI) data for a first communication link established between the first device and a second device in an environment of the first device. In some instances, the first CSI data may comprise multiple values of CSI data collected (e.g., multiple instances of magnitude and/or phase data collected over a period of time) for the first communication link. For instance, the first CSI data may include first magnitude data and first phase data.

At 504, the first device 104(1) may obtain second CSI data for a second communication link established between the first device and a third device in the environment. For instance, the second CSI data may comprise multiple values of CSI data (e.g., multiple instances of magnitude and/or phase data collected over a period of time) collected for the second communication link. For instance, the second CSI data may include second magnitude data and second phase data.

At 506, the first device 104(1) may identify a first variance in at least one of the first magnitude data or the first phase data caused by movement of the gesture 108 performed by the user 106. For instance, the first device 104(1) may obtain the first CSI data includes obtaining a first magnitude value or a first phase value at a first time and obtaining a second magnitude value or a second phase value at a second time, and identifying the first variance by determining a difference between at least one of the first magnitude value and second magnitude value or the first phase value and the second phase value. The method may further include determining that the difference is greater than or equal to a threshold difference indicating movement of the gesture 108.

At 508, the first device 104(1) may identify a second variance in at least one of the second magnitude data or the second phase data caused by movement of the gesture 108. At 510, the first device 104(1) may determine that the user 106 performing the gesture 108 is within a threshold proximity to the first device 104(1) based at least in part on the first variance and the second variance.

In some examples, the method may include determining the first proximity data at by determining, by the first user device 104(1) that a first variance in the first CSI data is less than a threshold variance, where the threshold variance representing interference with a signal of a communication link caused by movement of the gesture 108 (e.g., a threshold amount of fluctuation that indicates motion of an object causing the variance). Further, determining second proximity data may include determining, by the first device 104(1), that the second variance in the second CSI data is less than the threshold variance. Finally, determining third proximity data may include determining, by the first device 104(1), that the user 106 performing the gesture 108 is outside a threshold proximity from the first device based at least in part on the first variance and the second variance being less than the threshold variance.

In other examples, determining the first proximity data includes determining, by the first device 104(1), that a first fluctuation in the first CSI data is greater than or equal to a threshold fluctuation, where the threshold fluctuation representing interference with a communication link caused by movement of the gesture 108 and/or the user 106. Further, determining the second proximity data includes determining, by the first device 104(1), that a second fluctuation in the second CSI data is greater than or equal to the threshold fluctuation. Finally, determining the third proximity data includes determining that the gesture 108 is within a threshold proximity from the first device based at least in part on the first fluctuation and the second fluctuation being greater than or equal to the threshold fluctuation.

Figure 6:
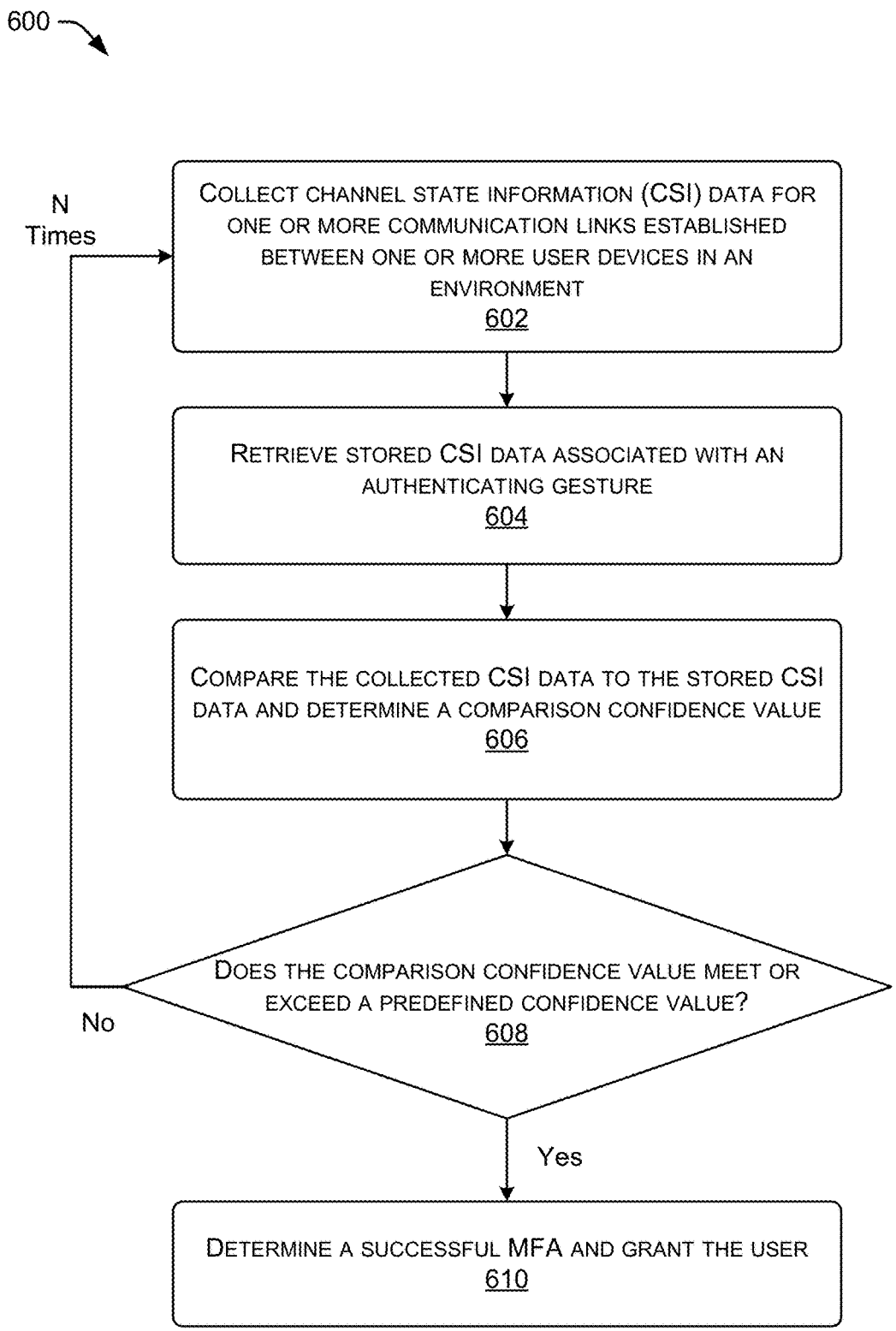
FIG. 6 illustrates a flow diagram of an example method for performance of gesture authentication techniques, according to aspects of this disclosure.

FIG. 6 illustrates a flow diagram of an example method 600 for performance of gesture authentication techniques by monitoring multiple communication links 114 and determining fluctuation data for the gesture 108 based on monitoring the communication links and comparing fluctuation data for the gesture 108 to stored fluctuation data associated with the authenticating gesture 206.

At 602, the user device(s) 104 may obtain the collected CSI data for one or more communication links 114 established between the user device(s) 104. In some instances, the collected CSI data may comprise multiple values of CSI data collected (e.g., multiple instances of magnitude and/or phase data collected over a period of time) for the communication links 114. For instance, the collected CSI data may include first magnitude data and first phase data.

At 604, the user device 104, access point 110, remote system 118, application service 120, authentication server 122, and/or the agent on AAP 204 may retrieve the stored CSI data from the memory 208. As such, any one of the foregoing devices may have access to the stored CSI data which is associated with the authenticating gesture 206 required to authenticate the MFA successfully.

At 606, the method 600 may compare the collected CSI data to the stored CSI data and determine a comparison confidence value. As such, any one of the forgoing devices may determine the comparison confidence value indicative of a match or not between the two sets of data. For example, the collected CSI data may contain fluctuations associated with the gesture 108 being performed by the user 106 and moving within the communication links 114 connecting the user devices 104. Further, the stored CSI data may contain fluctuations associated with the authenticating gesture 206 performed within the registration process 200. As such, any one of the foregoing devices may compare fluctuation patterns within the collected CSI data and the stored CSI data, respectively, to determine the comparison confidence value indicative of a match, or not, between the two sets of data.

At 608, any one of the foregoing devices may determine whether the gesture 108 performed by the user 106 meets or exceeds a predefined confidence. For example, the method 600 may ascribe a certain predefined confidence value (e.g., 75% match, 85% match, etc.) as a threshold vale. As such, the method 600 may determine whether the comparison confidence value at 606 meets or exceeds the predefined confidence value.

Where the comparison confidence value does not meet the predefined confidence value (e.g., a "No" at operation 608), the method 600 may return to operation 602. In such instances, the user 106 may be prompted to perform the gesture 108 again for the method 600 to restart. As such, repeatedly experiencing a "No" at operation 608 may restart the method 600 N-times as illustrated. In some other instances, the method 600 may restart indefinitely and/or until the user 106 cancels the method 600. In some other instances, the method 600 may not restart. As such, a "No" at operation 608 may terminate the method 600.

Where the comparison confidence value does meet the predefined confidence value (e.g., a "Yes" at operation 608), the method 600 may continue to operation 610.

At 610, the method 600 may determine a successful MFA, based at least in part on a "Yes" at operation 608, and grant the user 106 access and/or permission to perform a requested action.

Figure 7:
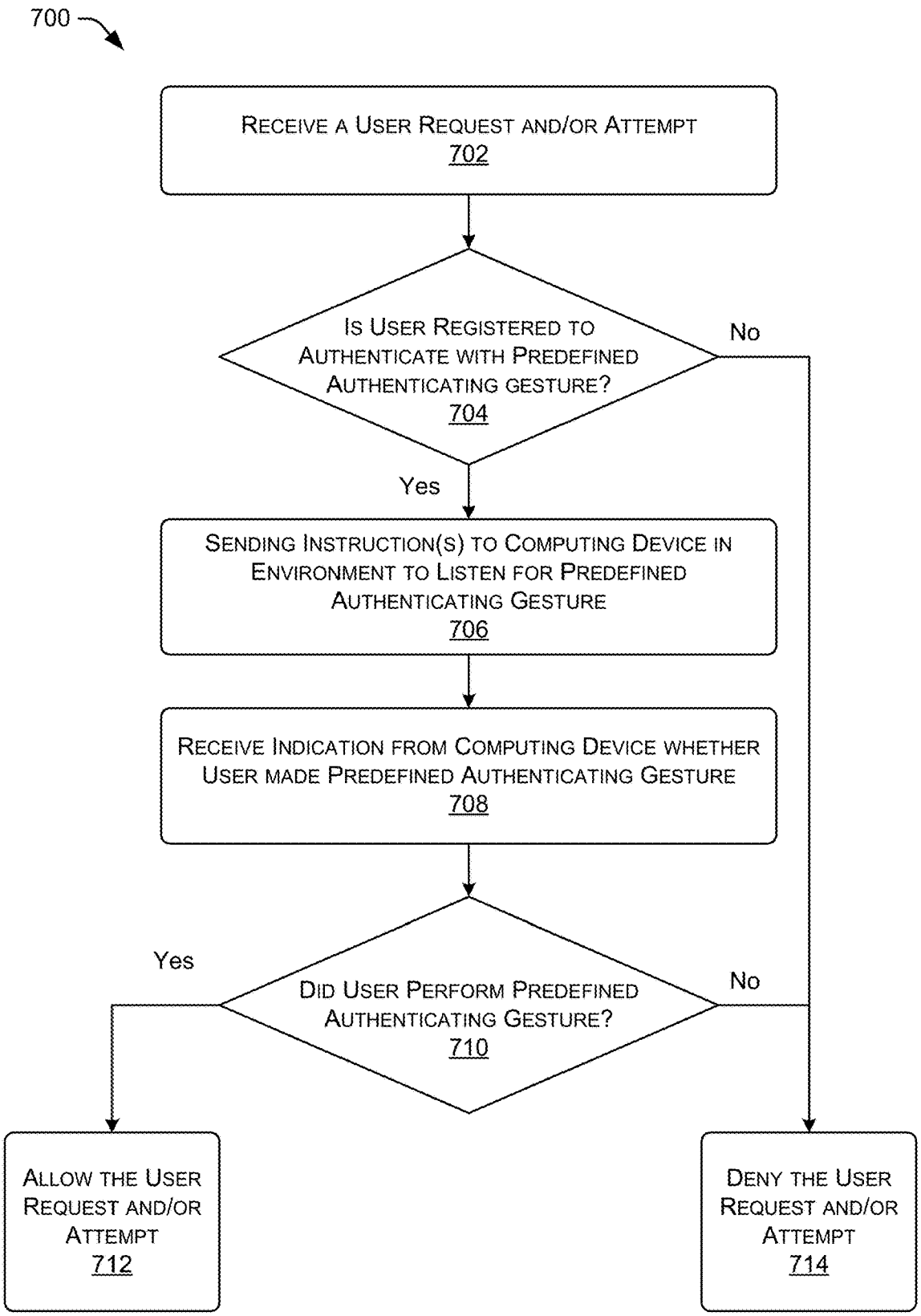
FIG. 7 illustrates a flow diagram of an example method of authenticating a gesture-based authentication technique, according to aspects of this disclosure.

FIG. 7 illustrates a flow diagram of an example method 700 of authenticating a gesture-based authentication technique by receiving information collected while the user 106 performed the gesture 108 and determining whether the gesture 108 performed matches the authenticating gesture 206.

At 702, the user device 104, the access point, the remote system 118, the application service, the authentication server, a website, an application, and/or the like may receive a request and/or an action attempt by the user 106. For example, the user 106 may attempt to request access to a restricted application on the user device 104. As such, the user device 104 may receive the request and/or the action attempt by the user 106.

At 704, the method 700 may determine if the user 106 is registered to authenticate the request and/or the action attempt by using the authenticating gesture 206 which has been predefined. For example, the registration process 200 may enable the user 106 to register the authenticating gesture 206. Further, the user 106 may be able to register the authenticating gesture 206 with a specific device. For example, referring to FIG. 2, the user 106 may select the particular device from the device selection 306 and may be presented with the gesture option 304, via the user interface 302. As such, the authenticating gesture 206 may be known as a predefined authenticating gesture.

Where the method 700 determines that the user 106 is registered to authenticate the MFA with the predefined authenticating gesture (e.g., the authenticating gesture 206) (e.g., a "Yes" at operation 704), the method 700 may proceed to operation 706.

At 706, the method 700 may include sending instructions, from the access point 110, remote system 118, application service 120, and/or the authentication server 122, to the user device 104 and/or the other user devices 104 (e.g., a computing device in the environment 102) to listen (e.g., collect data) for the predefined authenticating gesture.

At 708, the method 700 may include receiving, to the access point 110, remote system 118, application service 120, and/or the authentication server 122, an indication from the user device 104 and/or the other user devices 104 that the user 106 made the predefined authenticating gesture.

For example, the user devices 104 may have collected CSI data while the user 106 performed the predefined authenticating gesture. As such, fluctuations may have occurred within the CSI data moving within the communication links 114 during while the user 106 performed the gesture 108. Further, the user devices 104 may determine that the fluctuations are indicative of the user 106 providing the predefined authenticating gesture.

At 710, the method 700 may include determining, at the access point 110, remote system 118, application service 120, and/or the authentication server 122, whether the user 106 performed the predefined authenticating gesture (e.g., the authenticating gesture 206). For example For example, the user devices 104 may have collected CSI data while the user 106 performed the gesture 108. As such, fluctuations may have occurred within the CSI data moving within the communication links 114 connecting the user devices 104 during and/or while the user 106 performed the gesture 108. Further, the user devices 104 may determine that the fluctuations are indicative of the user 106 providing the gesture 108. In such instances, the user devices 104 may provide the collected CSI data to the access point 110, the remote system 118, the application service 120, and/or the authentication server 122 with an indication that the user 106 performed the gesture 108. As such, the user devices 104, the access point 110, the remote system 118, the application service 120, and/or the authentication server 122 may compare the collected CSI data to the stored CSI data to determine whether the gesture 108 performed by the user 106 matches the authenticating gesture 206.

Where the user did perform the predefined authenticating gesture (e.g., a "Yes" at operation 710), the method 700 may proceed to operation 712.

At 712, the method 700 may allow (e.g., grant) the request and/or the action attempt made by the user 106. For example, the user devices 104, the access point 110, remote system 118, application service 120, and/or the authentication server 122 may provide the user 106 with the allowance.

Where the user did not perform the predefined authenticating gesture (e.g., a "No" at operation 710), the method 700 may proceed to operation 714. Additionally, where the method 700 determines that the user 106 is not registered to authenticate the MFA with the predefined authenticating gesture (e.g., the authenticating gesture 206) (e.g., a "No" at operation 704), the method 700 may also proceed to operation 714.

At 714, the method 700 may deny (e.g., grant) the request and/or the action attempt made by the user 106. For example, the user devices 104, the access point 110, remote system 118, application service 120, and/or the authentication server 122 may provide the user 106 with the denial.

Figure 8:
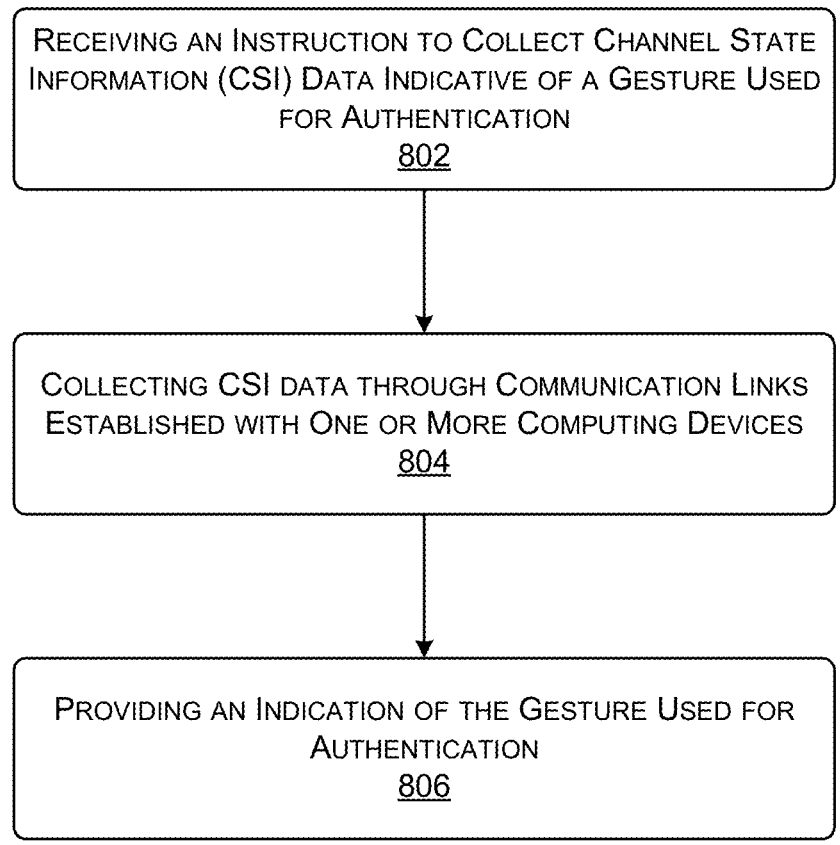
FIG. 8 illustrates a flow diagram of an example method of using channel state information (CSI) data to determine whether a user has performed a gesture for authentication, according to aspects of this disclosure.

FIG. 8 illustrates a flow diagram of an example method 800 of using channel state information (CSI) data to determine whether the user 106 has performed the gesture 108 for authentication through the collected CSI data.

At 802, the method 800 may include receiving, via the user device 104 and/or the other user devices 104, an instruction to collect CSI data indicative of the authenticating gesture 206 and/or the gesture 108 being performed by the user 106. As such, the access point 110, remote system 118, application service 120, and/or the authentication server 122 may send the instruction to the user device 104 and/or the other user devices 104. In some instances, the user device 104 and/or one or more of the other user devices 104 may receive the instruction to collect CSI data.

At 804, the user device 104 and/or the other user devices 104 may collect CSI data through the communication links 114(1)-114(N) (where "N" is any integer of 2 or greater) that may be established through one or more user devices 104 (e.g., computing devices). As such, CSI data moving through the communication links 114(1)-114(N) may fluctuate while the user 106 performs the gesture 108. For example, the gesture 108 may entail a hand wave which may alter the CSI data moving through the communication links 114. As such, a specific pattern may emerge in the collected CSI data collected while the user 106 was performing the gesture 108. Further, during the registration process 200, the authenticating gesture 206 may also have a pattern associated with the stored CSI data collected when the user 106 performed the authenticating gesture 206.

At 806, the user devices 104 may provide an indication of the gesture 108 used for MFA authentication. For example, the user devices 105 may provide the access point 110, the remote system 118, the application service 120, and/or the authentication server 122 an indication that the gesture 108 was performed by the user 106. For example, the user devices 104 may have collected CSI data while the user 106 performed the gesture 108. As such, fluctuations may have occurred within the CSI data moving within the communication links 114 during and/or while the user 106 performed the gesture 108. Further, the user devices 104 may determine that the fluctuations are indicative of the user 106 providing the gesture 108. In such instances, the user devices 104 may provide the collected CSI data to the access point 110, the remote system 118, the application service 120, and/or the authentication server 122 with an indication that the user 106 performed the gesture 108. In some further examples, the user devices 104, the access point 110, the remote system 118, the application service 120, and/or the authentication server 122 may compare the collected CSI data to the stored CSI data to determine whether the gesture 108 performed by the user 106 matches the authenticating gesture 206.

Figure 9:
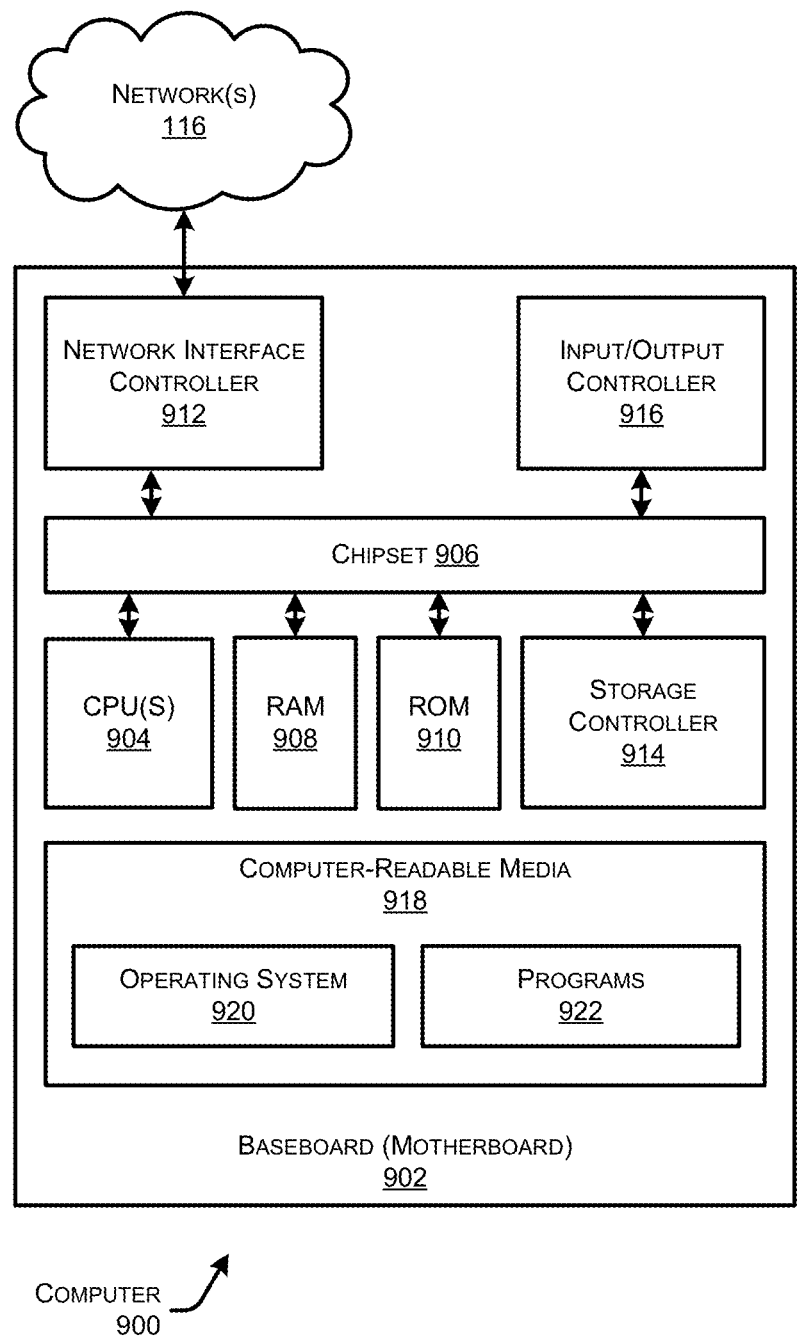
FIG. 9 is a computer architecture diagram showing an illustrative computer hardware architecture for implementing a computing device that can be utilized to implement aspects of the various technologies presented herein.

FIG. 9 shows an example computer architecture for a computer 900 capable of executing program components for implementing the functionality described above. The computer architecture shown in FIG. 9 illustrates a conventional server computer, workstation, desktop computer, laptop, tablet, network appliance, e-reader, smartphone, or other computing device, and can be utilized to execute any of the software components presented herein. The computer 900 may, in some examples, correspond to a physical server that is included in the user devices 104, the access point 110, the remote system 118, the application service 120, the authentication server 122, and/or the like as described herein, and may comprise networked devices such as servers, switches, routers, hubs, bridges, gateways, modems, repeaters, access points, etc.

The computer 900 includes a baseboard 902, or "motherboard," which is a printed circuit board to which a multitude of components or devices can be connected by way of a system bus or other electrical communication paths. In one illustrative configuration, one or more central processing units ("CPUs") 904 operate in conjunction with a chipset 906. The CPUs 904 can be standard programmable processors that perform arithmetic and logical operations necessary for the operation of the computer 900.

The CPUs 904 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 906 provides an interface between the CPUs 904 and the remainder of the components and devices on the baseboard 902. The chipset 906 can provide an interface to a RAM 908, used as the main memory in the computer 900. The chipset 906 can further provide an interface to a computer-readable storage medium such as a read-only memory ("ROM") 910 or non-volatile RAM ("NVRAM") for storing basic routines that help to startup the computer 900 and to transfer information between the various components and devices. The ROM 910 or NVRAM can also store other software components necessary for the operation of the computer 900 in accordance with the configurations described herein.

The computer 900 can operate in a networked environment using logical connections to remote computing devices and computer systems through a network, such as the network 116. The chipset 906 can include functionality for providing network connectivity through a NIC 912, such as a gigabit Ethernet adapter. The NIC 912 is capable of connecting the computer 900 to other computing devices over the network 116. It should be appreciated that multiple NICs 912 can be present in the computer 900, connecting the computer to other types of networks and remote computer systems.

The computer 900 can be connected to a storage device 918 that provides non-volatile storage for the computer. The storage device 918 can store an operating system 920, programs 922, and data, which have been described in greater detail herein. The storage device 918 can be connected to the computer 900 through a storage controller 914 connected to the chipset 906. The storage device 918 can consist of one or more physical storage units. The storage controller 914 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 900 can store data on the storage device 918 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 918 is characterized as primary or secondary storage, and the like.

For example, the computer 900 can store information to the storage device 918 by issuing instructions through the storage controller 914 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 900 can further read information from the storage device 918 by detecting the physical states or characteristics of one or more locations within the physical storage units.

In addition to the mass storage device 918 described above, the computer 900 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 900. In some examples, the operations performed by devices in a distributed application architecture, and or any components included therein, may be supported by one or more devices similar to computer 900. Stated otherwise, at least a portion of the operations performed by user devices 104, the access point 110, the remote system 118, the application service 120, the authentication server 122, and/or any components included therein, may be performed by one or more computer devices 900 operating in any system or arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 918 can store an operating system 920 utilized to control the operation of the computer 900. According to one instance, the operating system comprises the LINUX operating system. According to another instance, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 918 can store other system or application programs and data utilized by the computer 900.

In one example, the storage device 918 or other computer-readable storage media is encoded with computer-executable instructions which, when loaded into the computer 900, transform the computer from a general-purpose computing system into a special-purpose computer capable of implementing the embodiments described herein. These computer-executable instructions transform the computer 900 by specifying how the CPUs 904 transition between states, as described above. According to one example, the computer 900 has access to computer-readable storage media storing computer-executable instructions which, when executed by the computer 900, perform the various processes described above with regard to FIGS. 1-8. The computer 900 can also include computer-readable storage media having instructions stored thereupon for performing any of the other computer-implemented operations described herein.

The computer 900 can also include one or more input/output controllers 916 for receiving and processing input from a number of input devices, such as a keyboard, a mouse, a touchpad, a touch screen, an electronic stylus, or other type of input device. Similarly, an input/output controller 916 can provide output to a display, such as a computer monitor, a flat-panel display, a digital projector, a printer, or other type of output device. It will be appreciated that the computer 900 might not include all of the components shown in FIG. 9, can include other components that are not explicitly shown in FIG. 9, or might utilize an architecture completely different than that shown in FIG. 9.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method performed at least partly by an authentication service, comprising:
   receiving, at the authentication service, first channel state information (CSI) data from a computing device associated a user, wherein the first CSI data represents first variations in first properties of a first radio signal caused by a user making a predefined authenticating gesture through at least a portion of the first radio signal;
   storing, at the authentication service, the first CSI data in association with the user;
   receiving, at the authentication service and from an application service, a request to perform an authentication of the user attempting to perform an action with respect to the application service;
   determining that the user is registered to authenticate with the authentication service using the predefined authenticating gesture;
   receiving, from the computing device or another computing device in an environment of the user, second CSI data associated with the user, wherein the second CSI data represents second various in second properties of a second radio signal caused by a user making another gesture through at least a portion of the second radio signal;
   comparing the first CSI data to the second CSI data;
   determining whether the second CSI data represents the predefined authenticating gesture at least partly by determining whether the first CSI data corresponds to the second CSI data;
   in response to determining that the second CSI data corresponds to the first CSI data such that the user did make the predefined authenticating gesture, allowing the user to perform the action with respect to the application service; or
   in response to determining that the second CSI data does not correspond to the first CSI data such that user did not make the predefined authenticating gesture, denying the user to perform the action with respect to the application service.

2. The method of claim 1, wherein denying the user from performing the action includes instructing an authentication server associated with the application service to deny performing the action.

3. The method of claim 1, wherein allowing the user to perform the action includes instructing an authentication server associated with the application service to perform the action for the user.

4. The method of claim 1, further comprising:
   receiving, from the application service, an indication that the authentication is a secondary authentication in a multi-factor authentication; and
   determining that the predefined authenticating gesture is usable to perform the secondary authentication for the application service.

5. The method of claim 1, further comprising:
   determining that the user has a first predefined authenticating gesture registered for authenticating for use of a first application and a second predefined authenticating gesture registered for authenticating for use of a second application;
   determining that the user is attempting to perform the action with respect to the first application;
   identifying the first predefined authenticating gesture that is registered for authenticating for use of the first application; and
   verifying that a gesture made by the user matches to the first predefined authenticating gesture registered for authenticating for use of the first application.

6. The method of claim 5, further comprising:
   receiving from the computing device an indication that the gesture made by the user matches to the predefined authenticating gesture.

7. The method of claim 1, further comprising:
   instructing a mobile device to collect the first CSI data for a duration of time;
   receiving the first CSI data collected by the mobile device; and
   determining whether the first CSI data matches the second CSI data associated with the predefined authenticating gesture.

8. The method of claim 1, wherein the receiving the first CSI data from the computing device is from an active sensing associated with the gesture made by the user holding the computing device or, wherein the receiving the first CSI data from the computing device is from a passive sensing associated with the gesture made by the user and sensed by the computing device a distance away from the user.

9. The method of claim 1, further comprising:
   determining a proximity of the computing device in the environment of the user to the predefined authenticating gesture made by the user.

10. A system, comprising:
    one or more processors; and
    one or more non-transitory computer-readable media storing computer-executable instructions that, when executed by the one or more processors, cause the one or more processors to perform operations comprising:
    receiving, at an authentication server, first channel state information (CSI) data from a computing device associated a user, wherein the first CSI data represents first variations in first properties of a first radio signal caused by a user making a predefined authenticating gesture through at least a portion of the first radio signal;
    storing, at the authentication server, the first CSI data in association with the user;
    receiving, at an authentication server and from an application service, a request to perform an authentication of the user attempting to perform an action with respect to the application service;
    determining that the user is registered to authenticate with an authentication service using the predefined authenticating gesture;

receiving, from the computing device or another computing device in an environment of the user, second CSI data associated with the user, wherein the second CSI data represents second various in second properties of a second radio signal caused by a user making another gesture through at least a portion of the second radio signal;

comparing the CSI data to the second CSI data;

determining whether the second CSI data represents the predefined authenticating gesture at least partly by determining whether the first CSI data corresponds to the second CSI data;

in response to determining that the second CSI data corresponds to the first CSI data such that the user did make the predefined authenticating gesture, allowing the user to perform the action with respect to the application service; or in response to determining that the second CSI data does not correspond to the first CSI data such that user did not make the predefined authenticating gesture, denying the user to perform the action with respect to the application service.

11. The system of claim 10, the operations further comprising:

receiving, from the application service, an indication that the authentication is a secondary authentication in a multi-factor authentication; and determining that the predefined authenticating gesture is usable to perform the secondary authentication for the application service.

12. The system of claim 10, the operations further comprising:

determining that the user has a first predefined authenticating gesture registered for authenticating for use of a first application and a second predefined authenticating gesture registered for authenticating for use of a second application;

determining that the user is attempting to perform the action with respect to the first application;

identifying the first predefined authenticating gesture that is registered for authenticating for use of the first application; and verifying that a gesture made by the user matches to the first predefined authenticating gesture registered for authenticating for use of the first application.

13. The system of claim 12, the operations further comprising:

receiving from the computing device an indication that the gesture made by the user matches to the predefined authenticating gesture.

14. The system of claim 10, the operations further comprising:

instructing a mobile device to collect the first CSI data for a duration of time;

receiving the first CSI data collected by the mobile device; and determining whether the first CSI data matches the second CSI data associated with the predefined authenticating gesture.

15. One or more non-transitory computer-readable media storing computer-executable instructions that, when executed by one or more processors, cause the one or more processors to perform operations comprising:

receiving, at an authentication service, first channel state information (CSI) data from a computing device associated a user, wherein the first CSI data represents first variations in first properties of a first radio signal caused by a user making a predefined authenticating gesture through at least a portion of the first radio signal;

storing, at the authentication service, the first CSI data in association with the user;

receiving, at the authentication service and from an application service, a request to perform an authentication of the user attempting to perform an action with respect to the application service;

determining that the user is registered to authenticate with the authentication service using the predefined authenticating gesture;

receiving, from the computing device or another computing device in an environment of the user, second CSI data associated with the user, wherein the second CSI data represents second various in second properties of a second radio signal caused by a user making another gesture through at least a portion of the second radio signal;

comparing the first CSI data to the second CSI data;

determining whether the second CSI data represents the predefined authenticating gesture at least partly by determining whether the first CSI data corresponds to the second CSI data; and in response to determining that the second CSI data corresponds to the first CSI data such that the user did make the predefined authenticating gesture, allowing the user to perform the action with respect to the application service; or in response to determining that the second CSI data does not correspond to the first CSI data such that user did not make the predefined authenticating gesture, denying the user to perform the action with respect to the application service.

16. The one or more non-transitory computer-readable media of claim 15, wherein denying the user from performing the action includes instructing an authentication server associated with the application service to deny performing the action.

17. The one or more non-transitory computer-readable media of claim 15, wherein allowing the user to perform the action includes instructing an authentication server associated with the application service to perform the action for the user.

18. The one or more non-transitory computer-readable media of claim 15, the operations further comprising:

receiving, from the application service, an indication that the authentication is a secondary authentication in a multi-factor authentication; and determining that the predefined authenticating gesture is usable to perform the secondary authentication for the application service.

19. The one or more non-transitory computer-readable media of claim 15, the operations further comprising:

determining that the user has a first predefined authenticating gesture registered for authenticating for use of a first application and a second predefined authenticating gesture registered for authenticating for use of a second application;

determining that the user is attempting to perform the action with respect to the first application;

identifying the first predefined authenticating gesture that is registered for authenticating for use of the first application; and verifying that a gesture made by the user matches to the first predefined authenticating gesture registered for authenticating for use of the first application.

20. The one or more non-transitory computer-readable media of claim 15, the operations further comprising:
receiving from the computing device an indication that the gesture made by the user matches to the predefined authenticating gesture.

* * * * *